Figure 1:
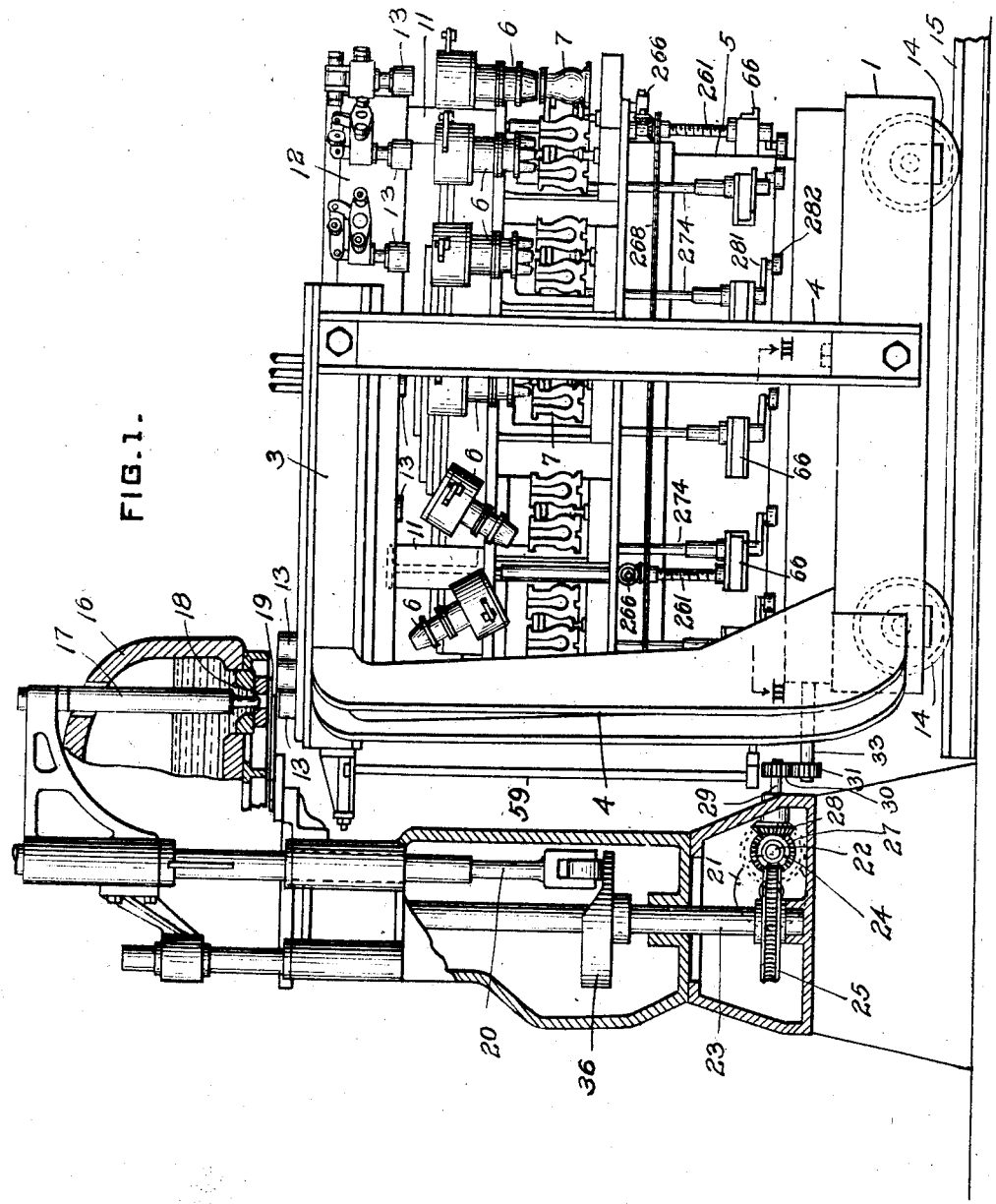

Oct. 30, 1928.

T. H. SLOAN 1,689,975

GLASS FORMING MACHINE

Filed Oct. 12, 1926

18 Sheets-Sheet 1

WITNESSES

INVENTOR

Oct. 30, 1928.

T. H. SLOAN 1,689,975

GLASS FORMING MACHINE

Filed Oct. 12, 1926     18 Sheets-Sheet 2

WITNESSES

INVENTOR

Oct. 30, 1928.

T. H. SLOAN 1,689,975

GLASS FORMING MACHINE

Filed Oct. 12, 1926    18 Sheets-Sheet 3

INVENTOR
Theodore H. Sloan
by Winter Brown & Critchlow
his attorneys.

WITNESSES
J. Herbert Bradley

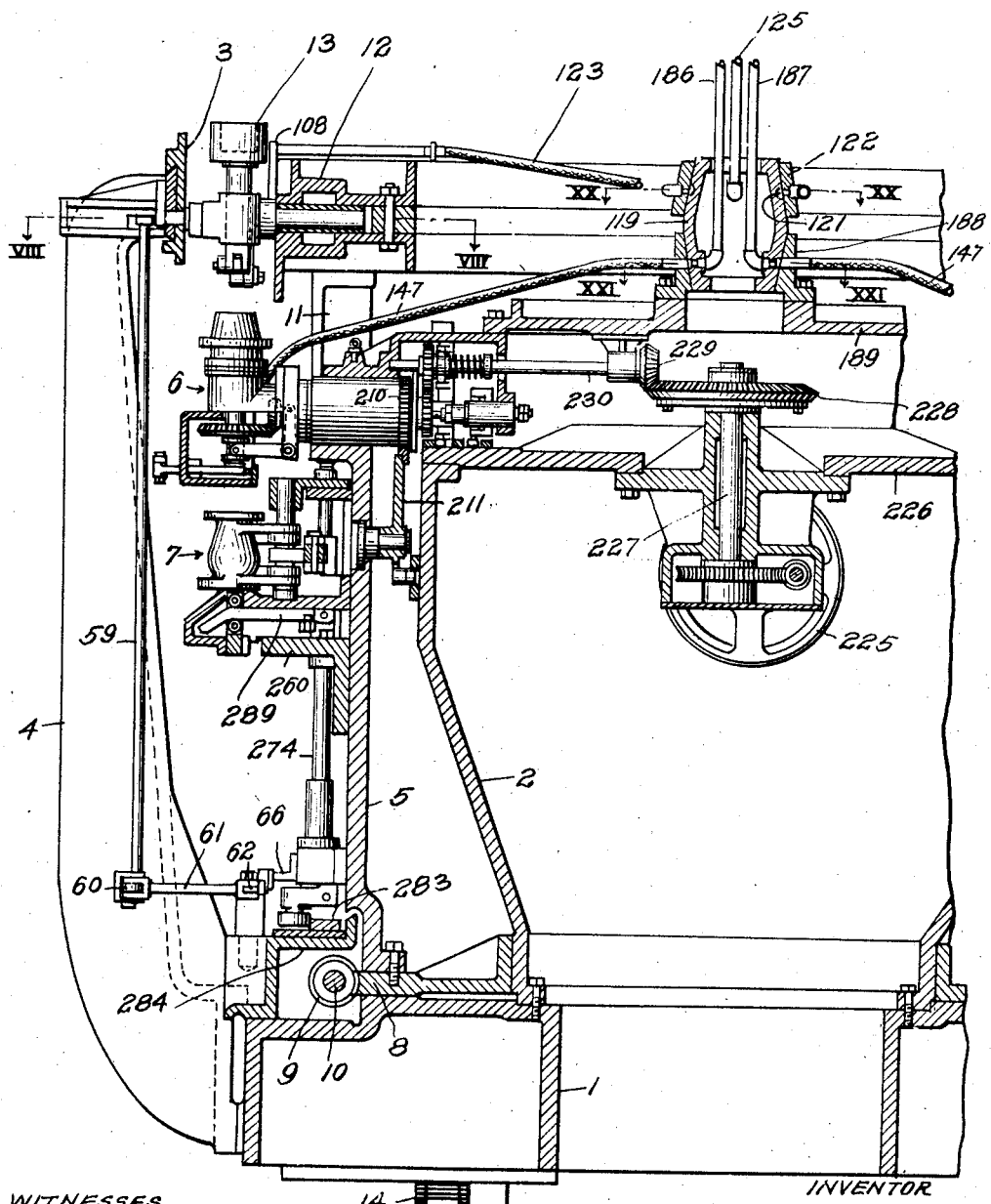

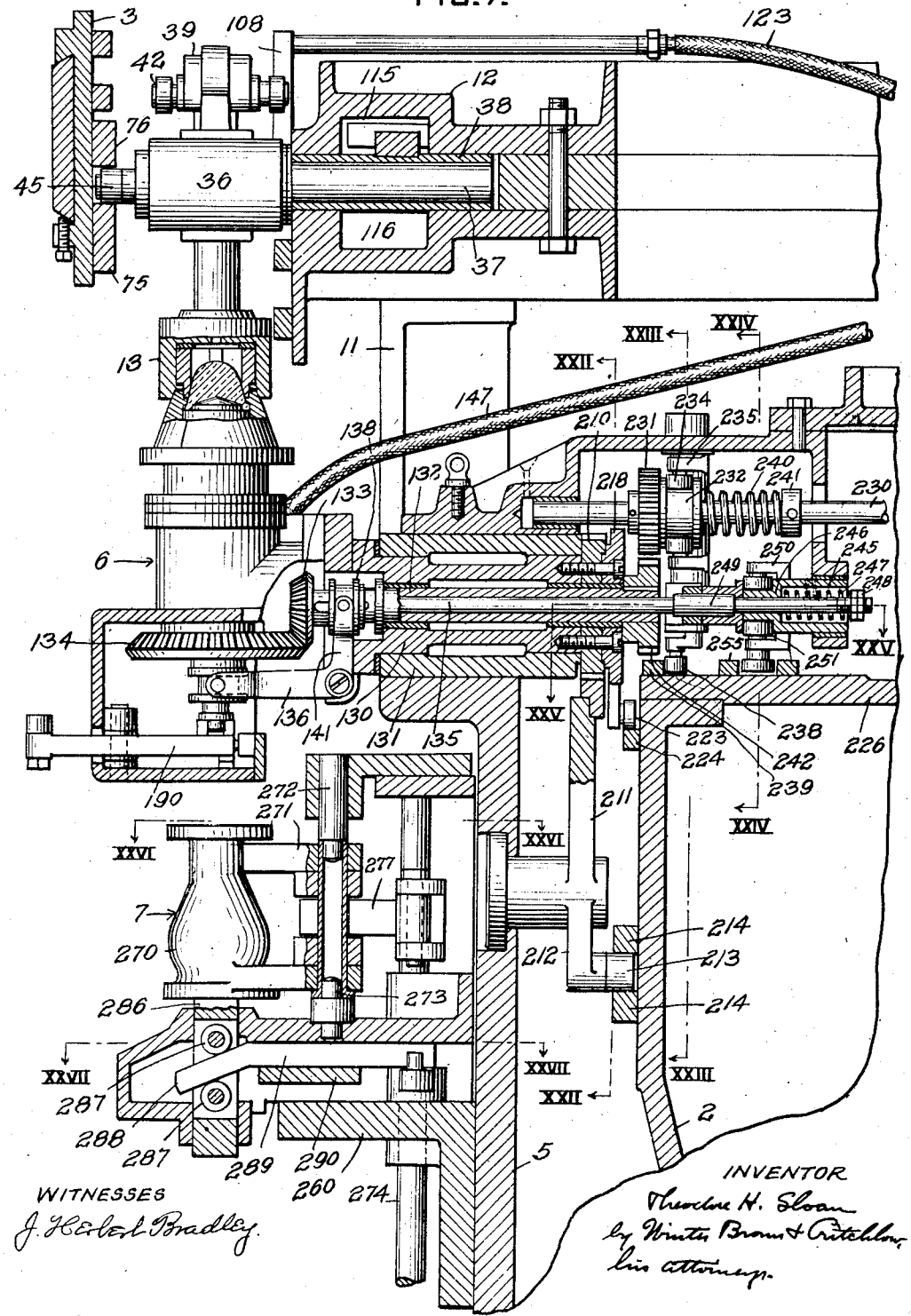

Oct. 30, 1928.

T. H. SLOAN 1,689,975

GLASS FORMING MACHINE

Filed Oct. 12, 1926     18 Sheets-Sheet 6

WITNESSES

INVENTOR
Theodore H. Sloan
by Winter Brown & Critchlow
his attorneys.

Oct. 30, 1928.

T. H. SLOAN 1,689,975

GLASS FORMING MACHINE

Filed Oct. 12, 1926     18 Sheets-Sheet 7

INVENTOR
Theodore H. Sloan
by Winter, Brown & Critchlow
his attorneys.

WITNESSES
J. Herbert Bradley

Oct. 30, 1928.

T. H. SLOAN 1,689,975

GLASS FORMING MACHINE

Filed Oct. 12, 1926  18 Sheets-Sheet 9

INVENTOR

Oct. 30, 1928.

T. H. SLOAN 1,689,975

GLASS FORMING MACHINE

Filed Oct. 12, 1926

18 Sheets-Sheet 12

Oct. 30, 1928.

T. H. SLOAN 1,689,975

GLASS FORMING MACHINE

Filed Oct. 12, 1926     18 Sheets-Sheet 13

Oct. 30, 1928.

T. H. SLOAN 1,689,975

GLASS FORMING MACHINE

Filed Oct. 12, 1926   18 Sheets-Sheet 14

WITNESSES
J. Herbert Bradley

INVENTOR
Theodore H. Sloan
by Winter, Brown & Critchlow
his attorneys.

Oct. 30, 1928.

T. H. SLOAN 1,689,975

GLASS FORMING MACHINE

Filed Oct. 12, 1926     18 Sheets-Sheet 15

Oct. 30, 1928.

T. H. SLOAN 1,689,975

GLASS FORMING MACHINE

Filed Oct. 12, 1926    18 Sheets—Sheet 16

WITNESSES
J. Herbert Bradley.

INVENTOR
Theodore H. Sloan
by Winter Brown & Critchlow
his attorneys.

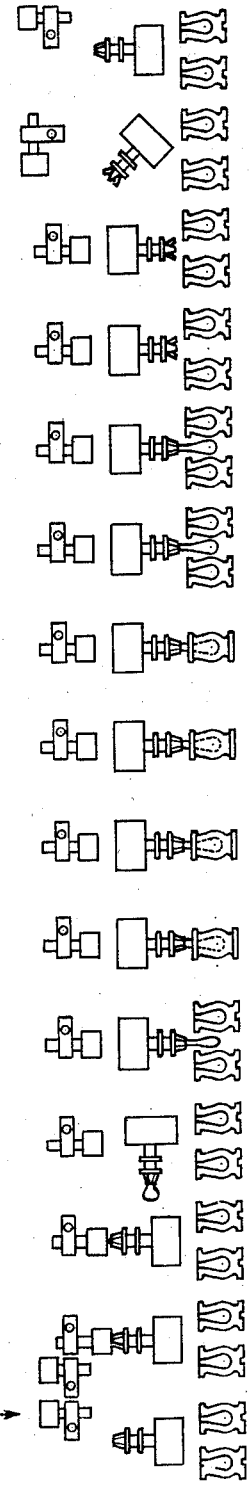

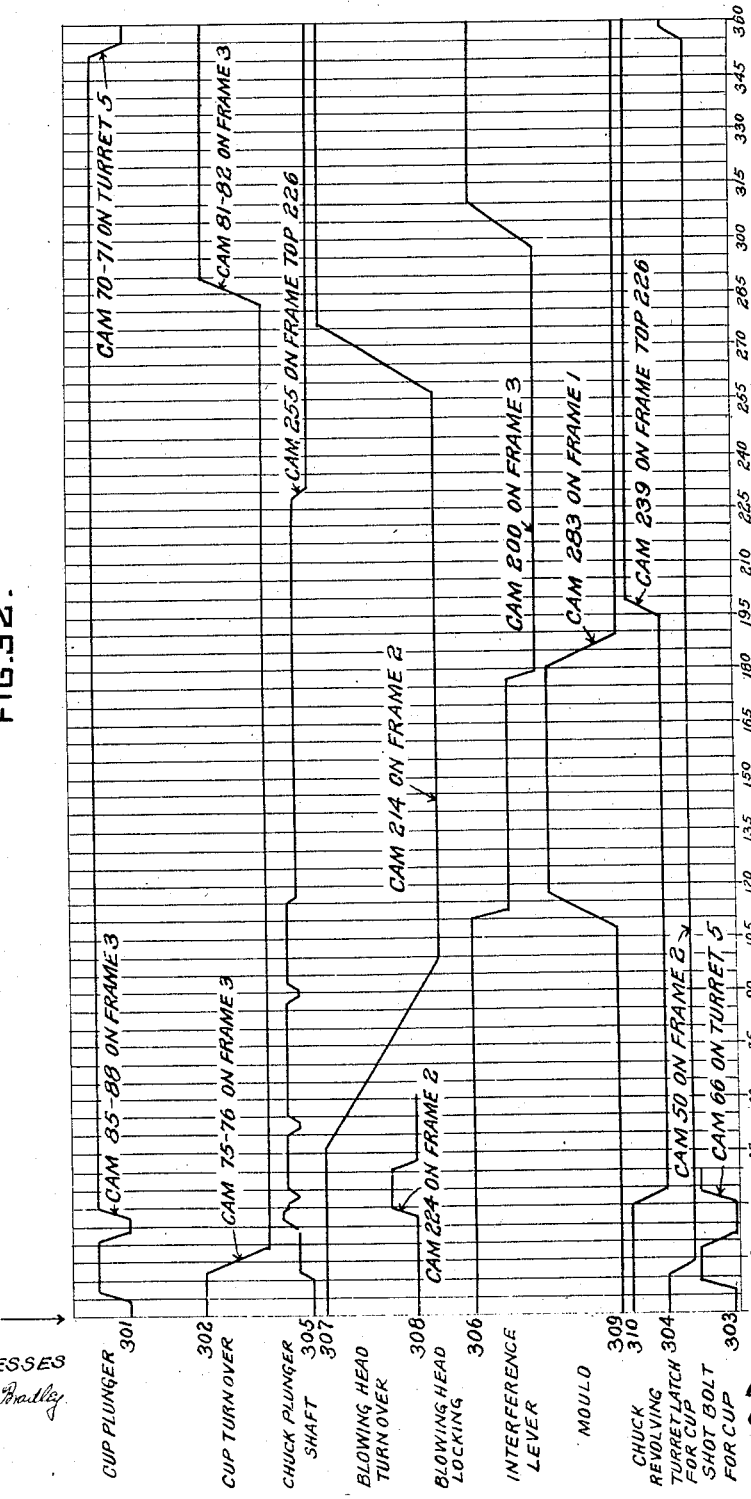

Patented Oct. 30, 1928.

1,689,975

UNITED STATES PATENT OFFICE.

THEODORE H. SLOAN, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

GLASS-FORMING MACHINE.

Application filed October 12, 1926. Serial No. 141,097.

The invention relates to glass forming machines of the type in which glass from a source of supply is mechanically delivered to forming units which are operated in coordination with the glass delivery mechanism. In other words, it relates to full automatic glass forming machines. In its broader aspects, it is applicable to various species of glass forming machines, including press and blow machines and blowing machines of either the iron or paste-mold type. However, the invention is particularly applicable to paste-mold machines for the manufacture of electric lamp bulbs, lamp chimneys, tumblers, and other paste-mold articles, and it is such a machine that is herein illustrated and specifically described.

An object of the invention is to improve the mechanism for receiving glass from coordinated glass delivery apparatus, and for delivering the received glass to forming units of a machine.

A further object is to so simplify and otherwise improve the construction and operation of forming and blowing units of blowing machines, particularly paste-mold machines, and to so improve the construction and operation of the machine as a whole, that blown glass articles, and particularly paste-mold articles, may be more economically manufactured.

Figure 2:
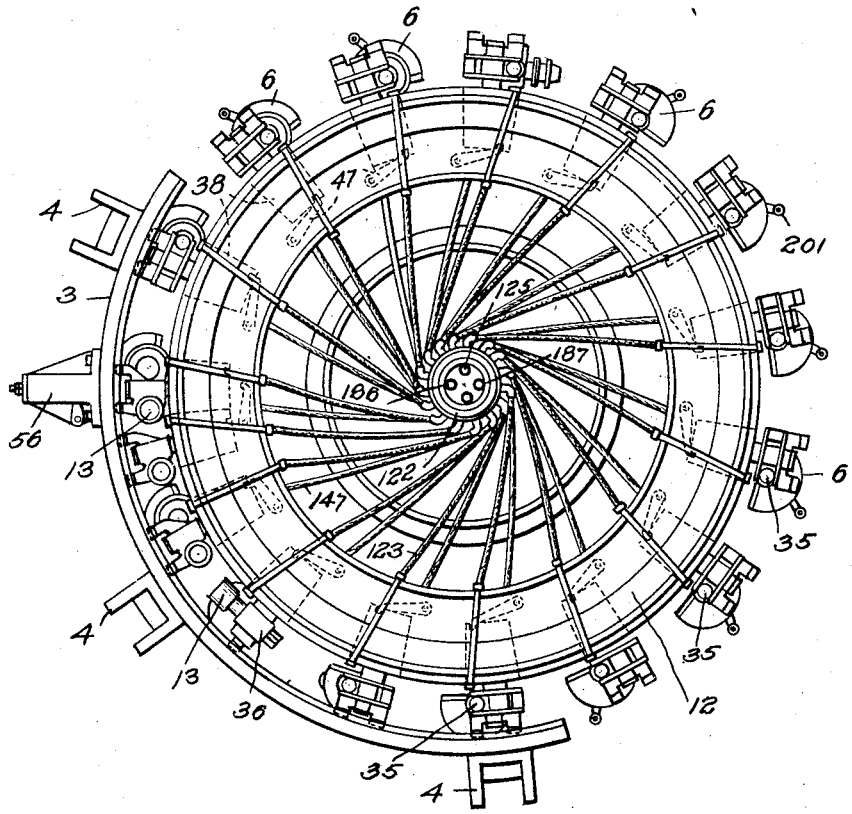
Figure 3:
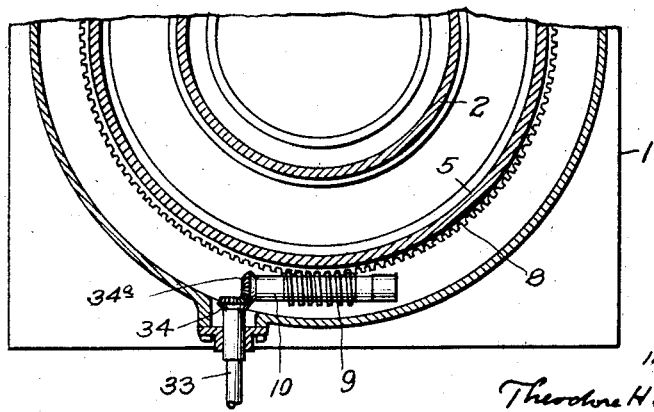
Figure 5:
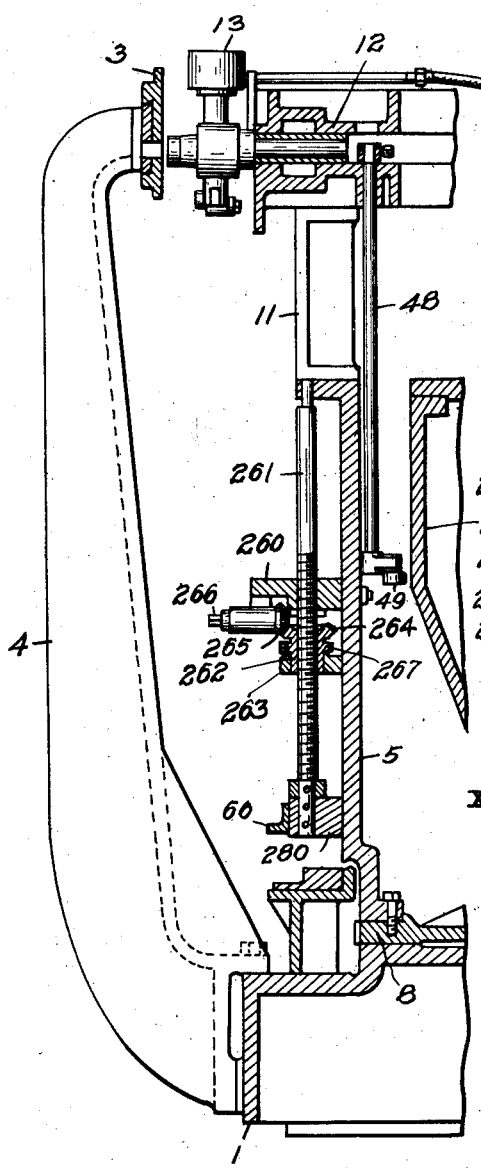
Figure 4:
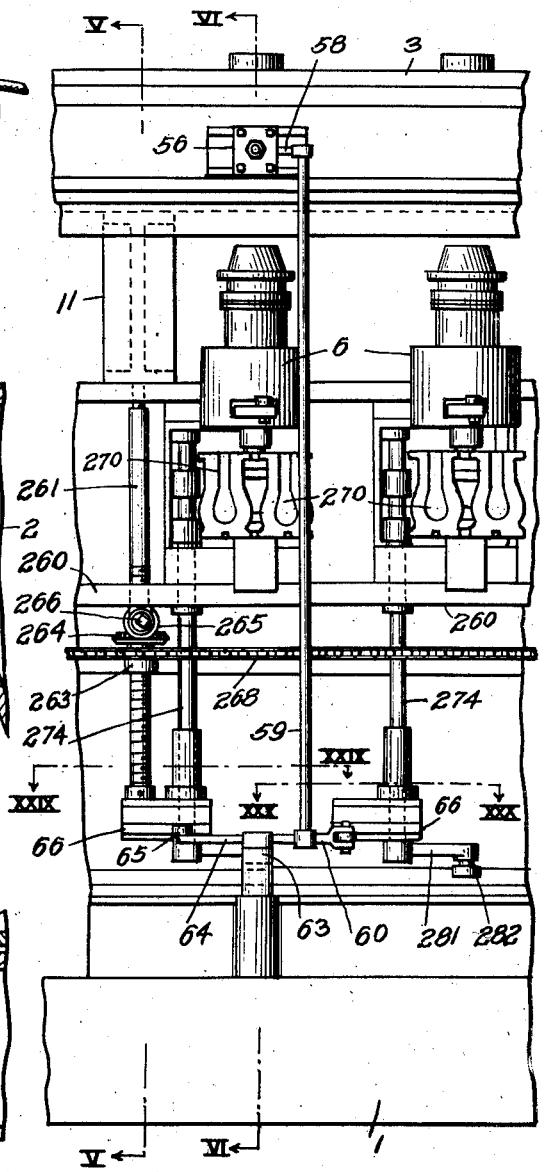
Figure 8:
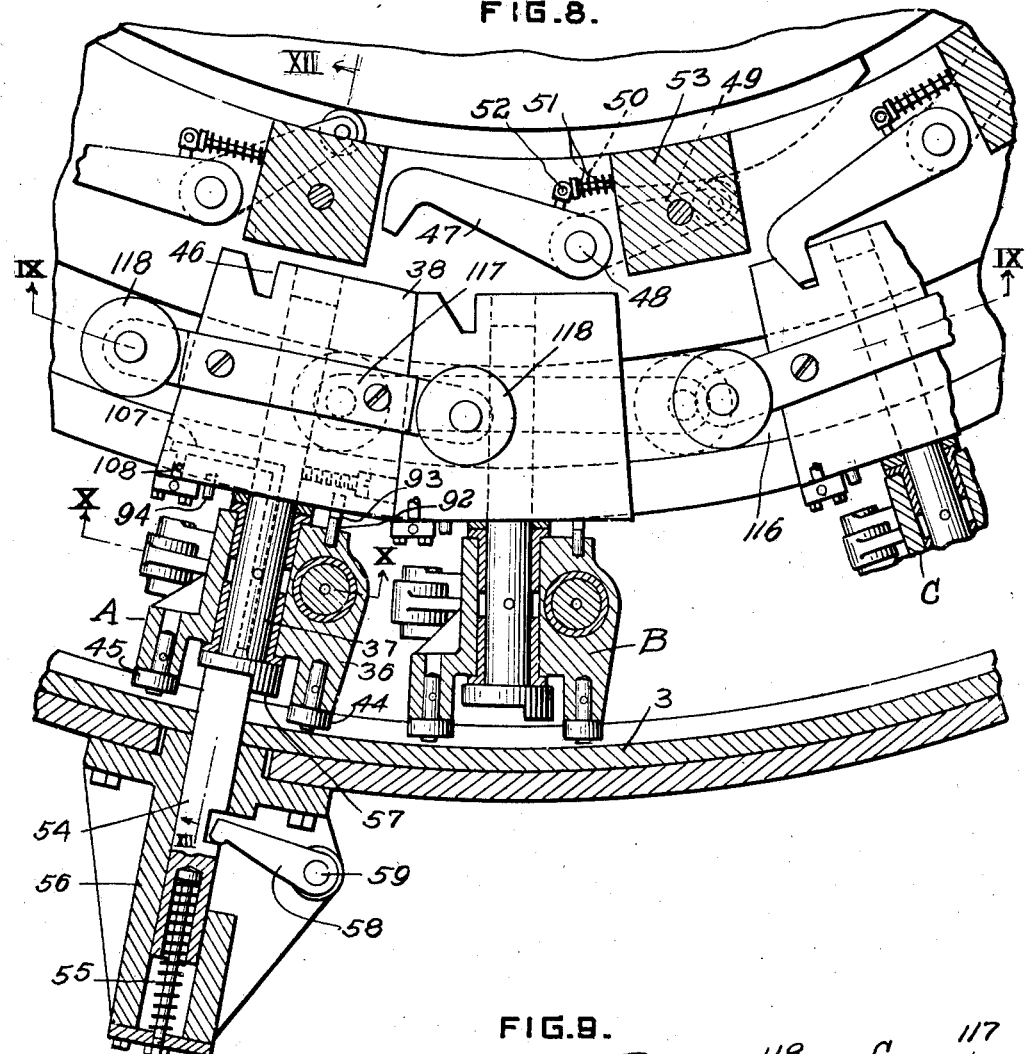
Figure 9:
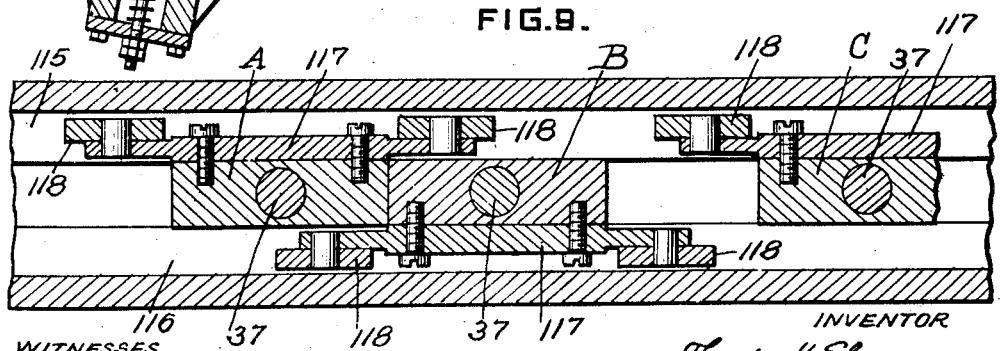
Figure 11:
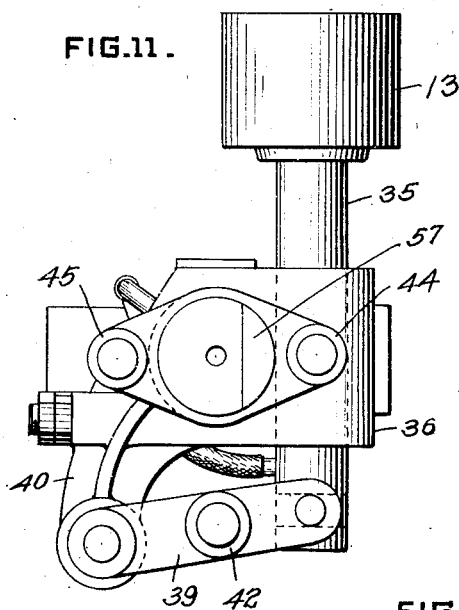
Figure 10:
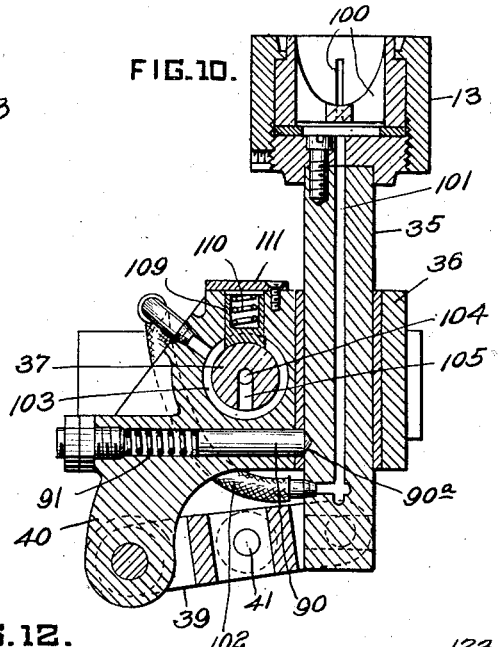
Figure 12:
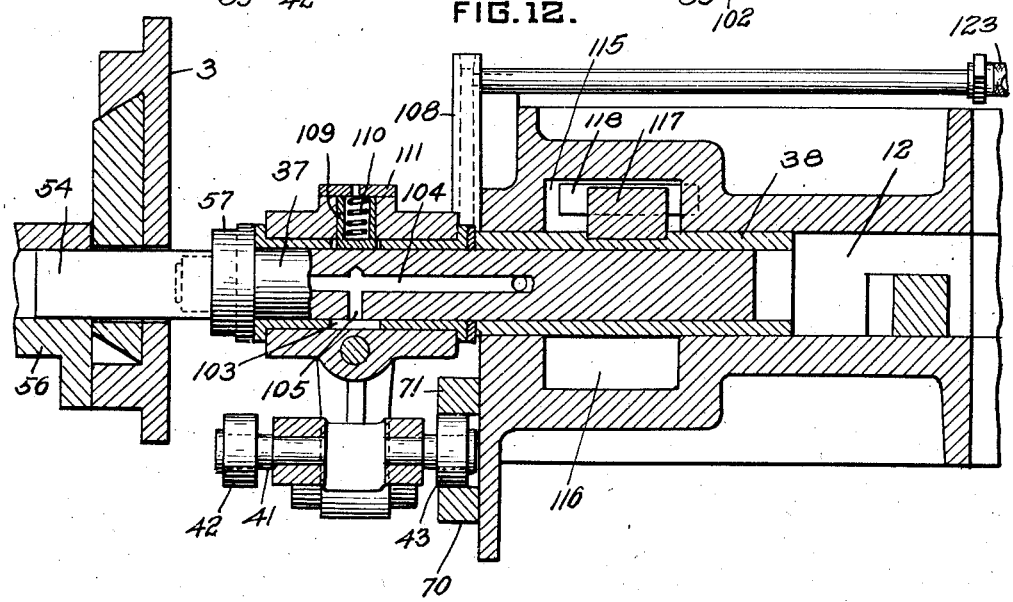
Figure 13:
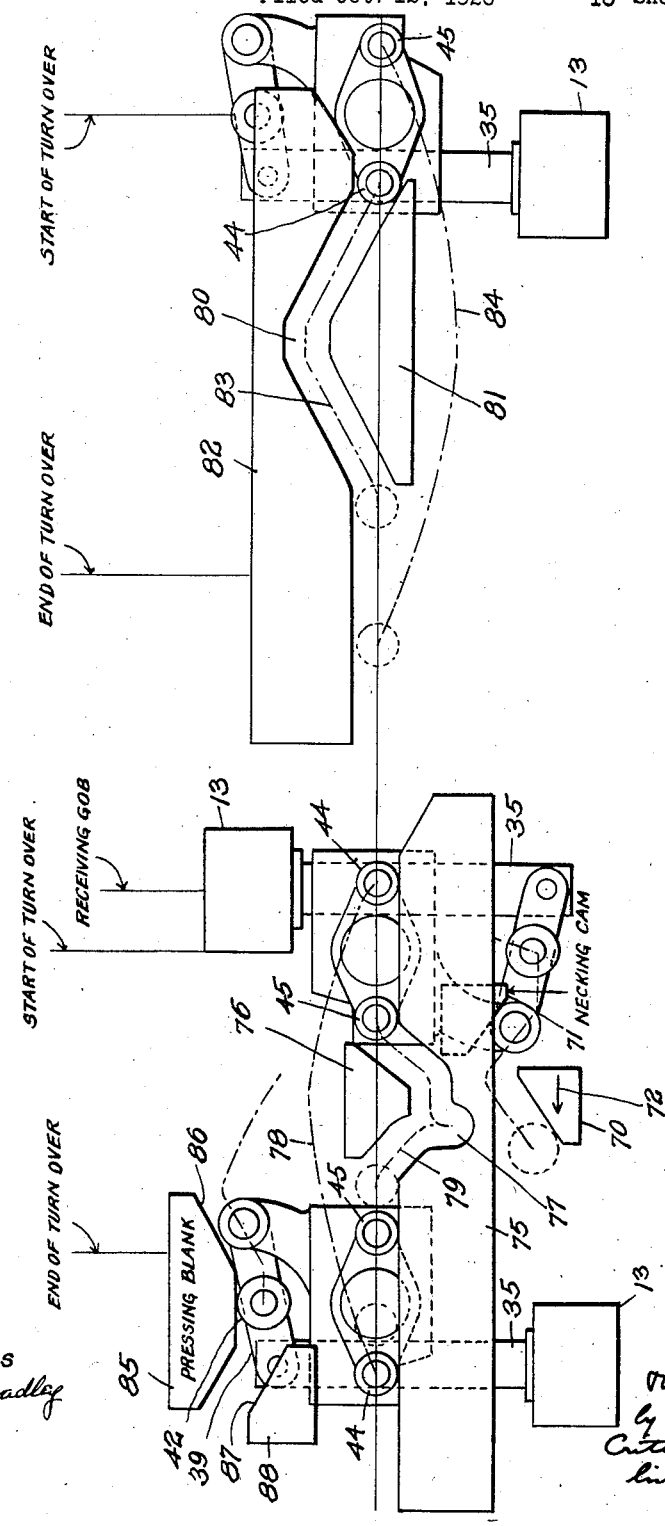
Figure 14:
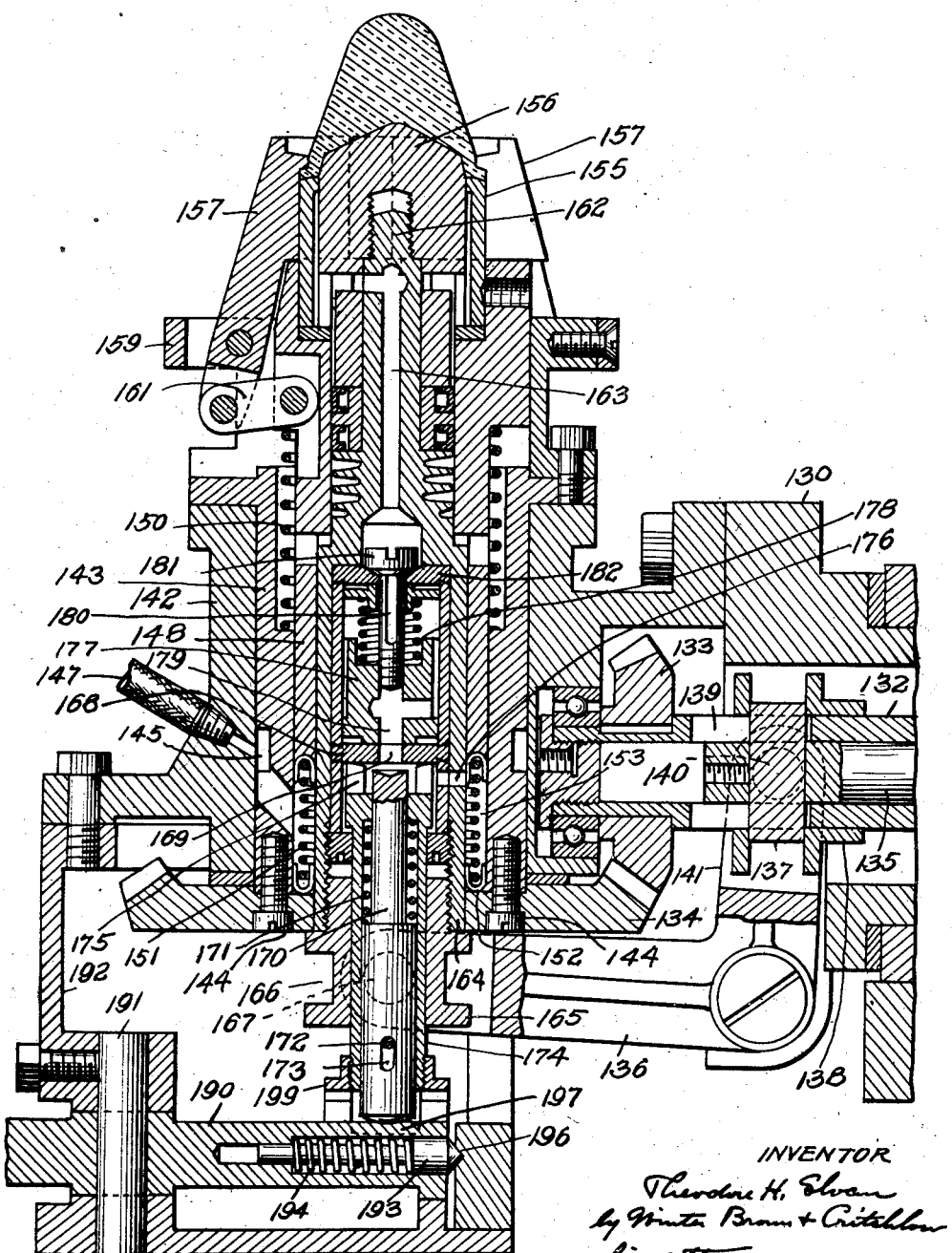
Figure 15:
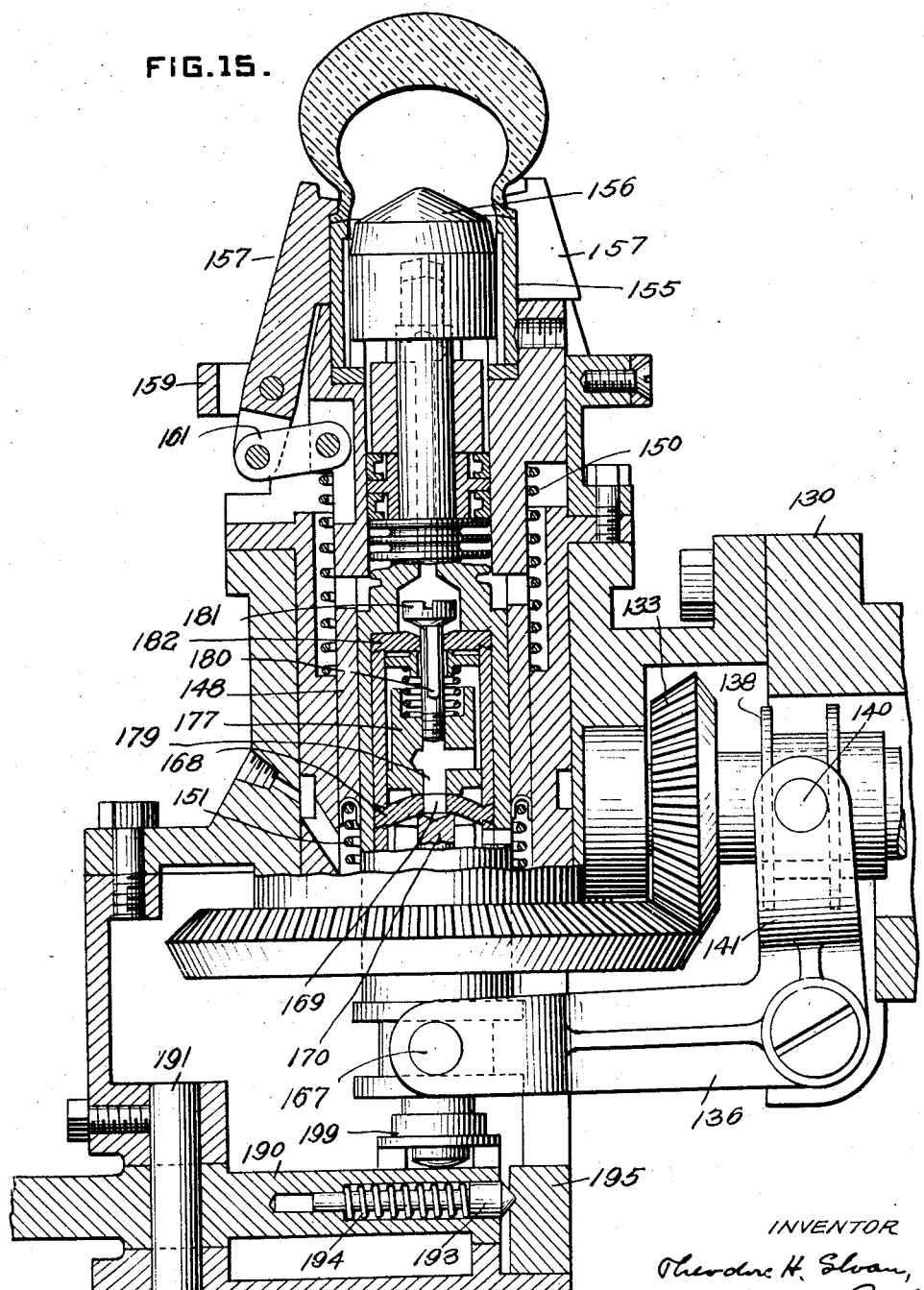
Figure 16:
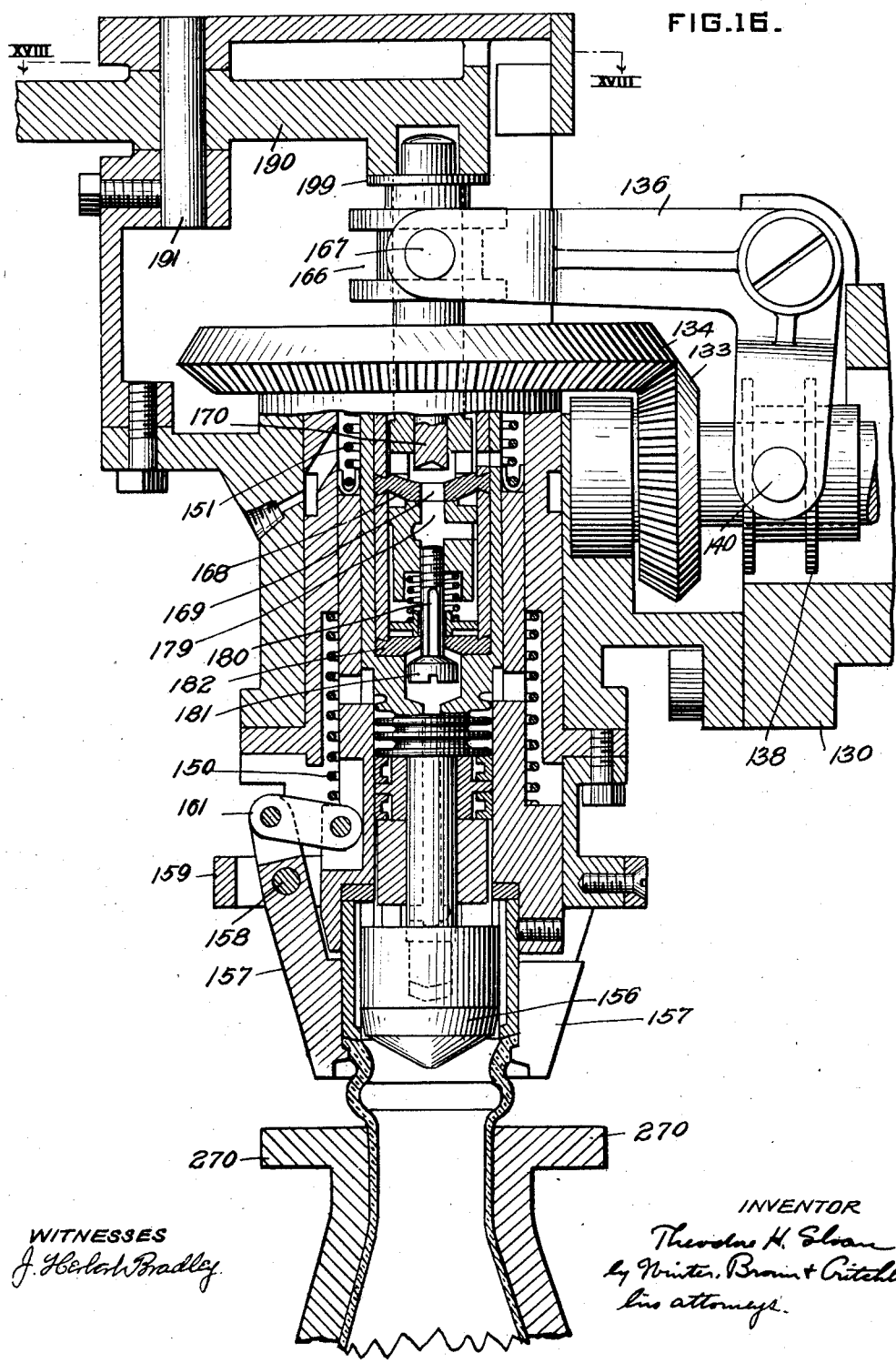
Figure 17:
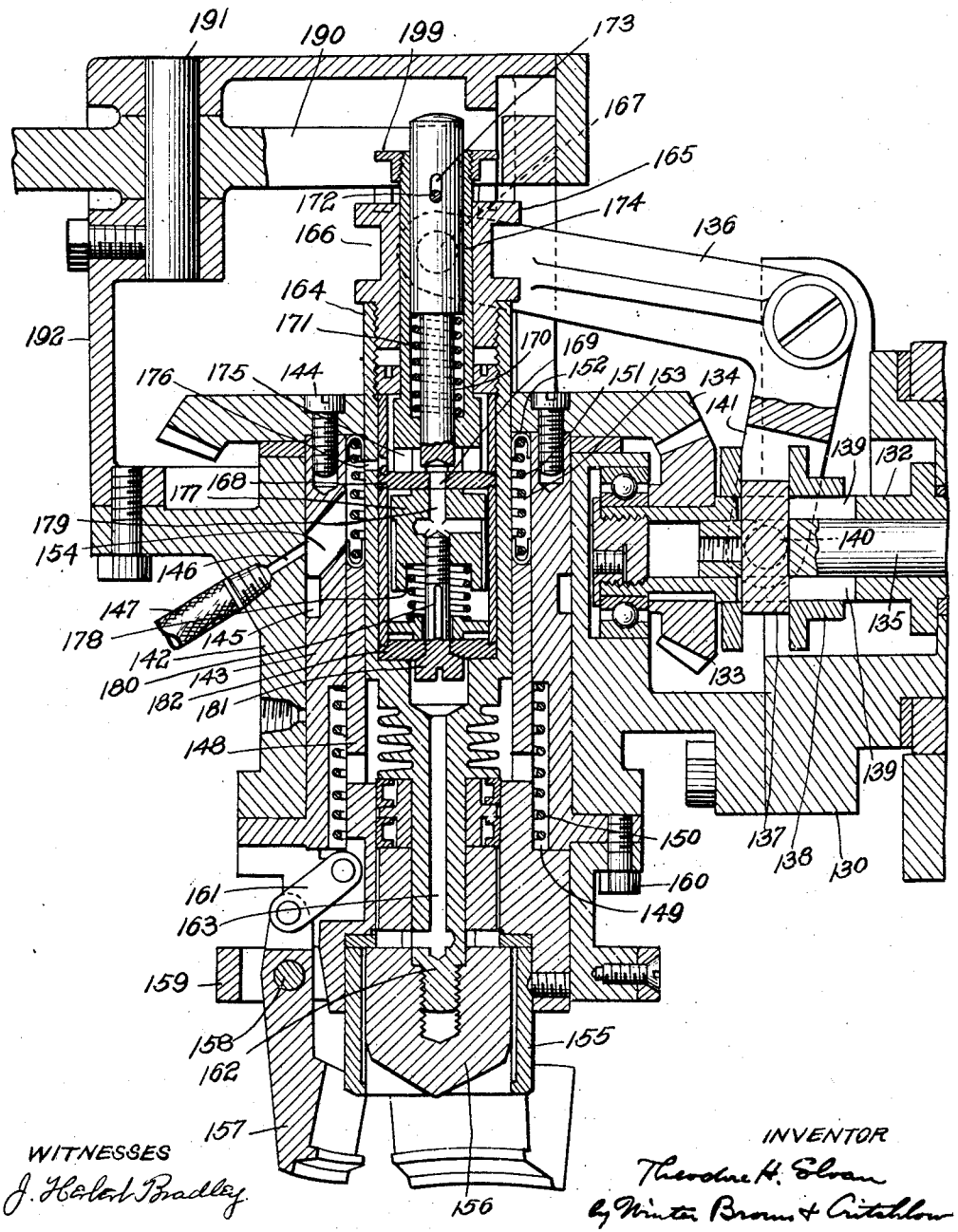
Figure 18:
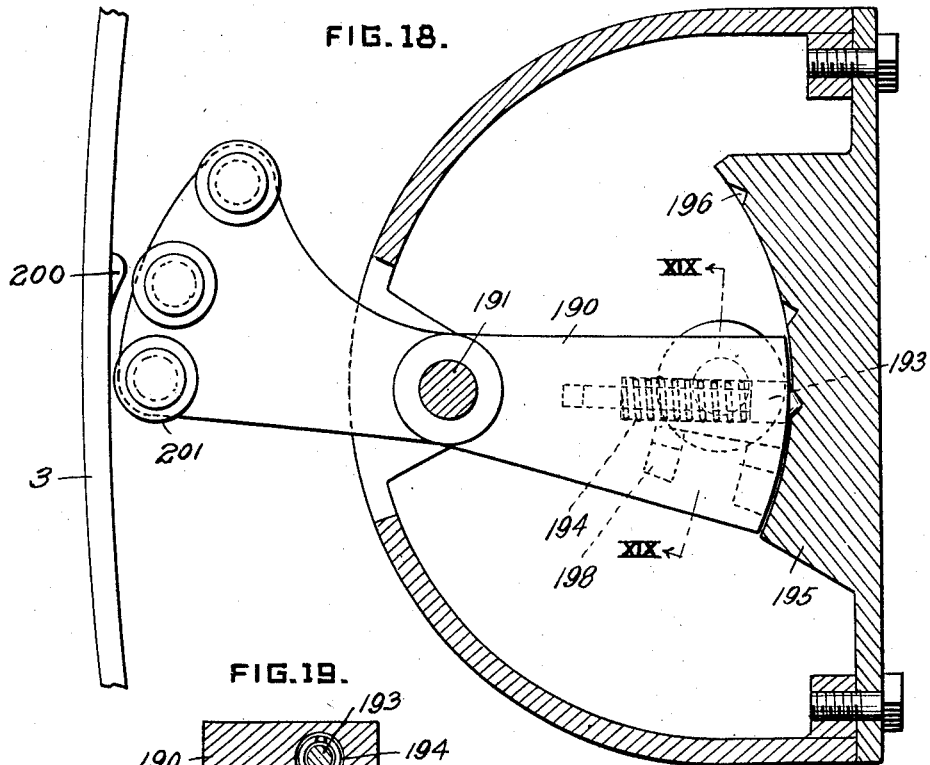
Figure 19:
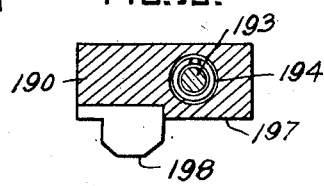
Figure 20:
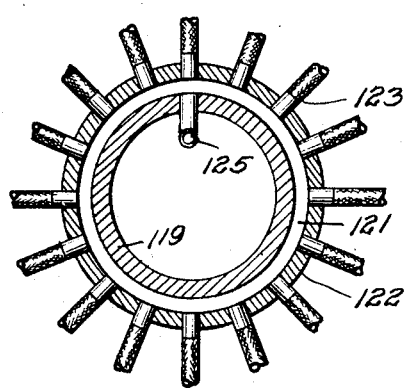
Figure 21:
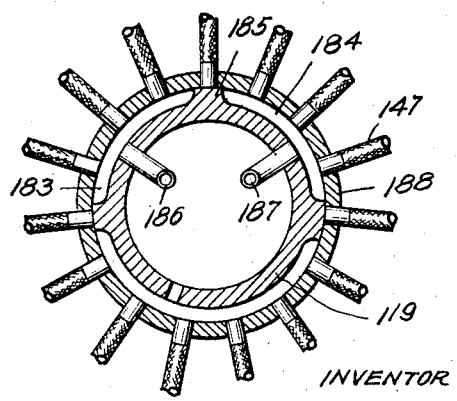
Figure 23:
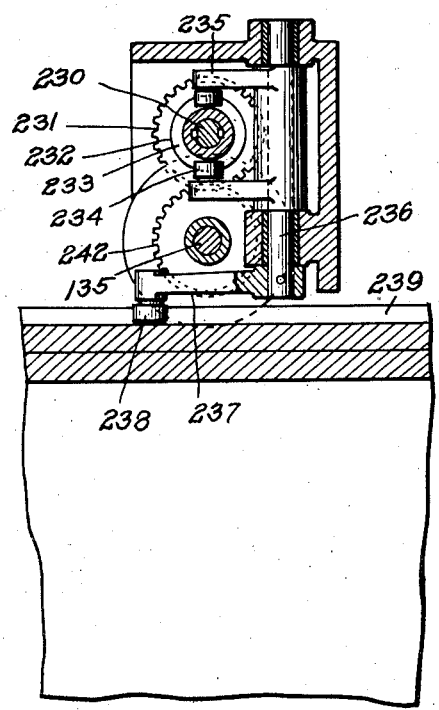
Figure 22:
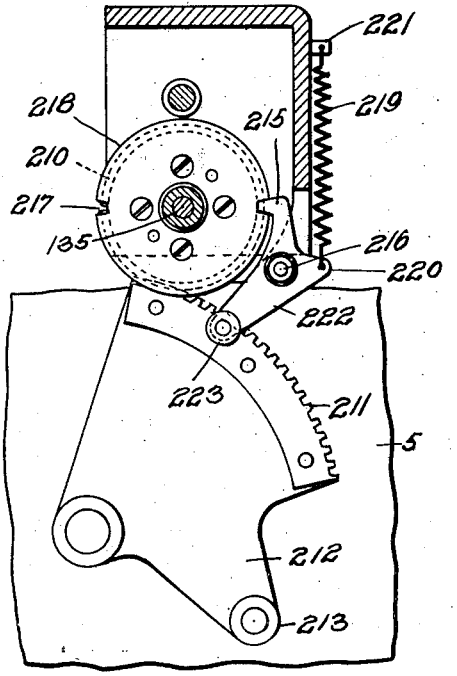
Figure 24:
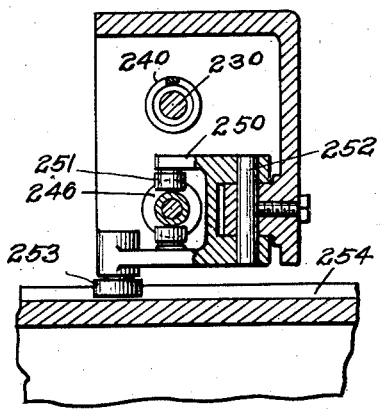
Figure 25:
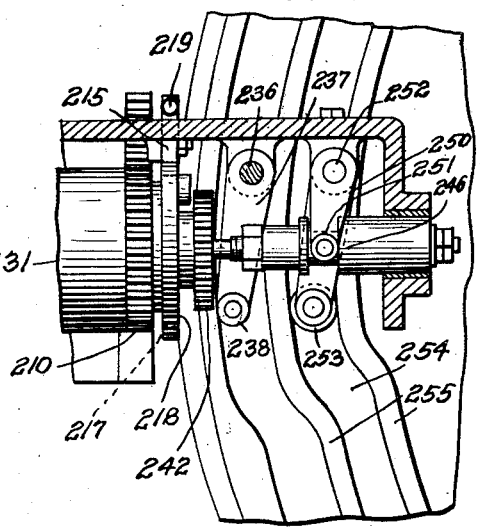
Figure 26:
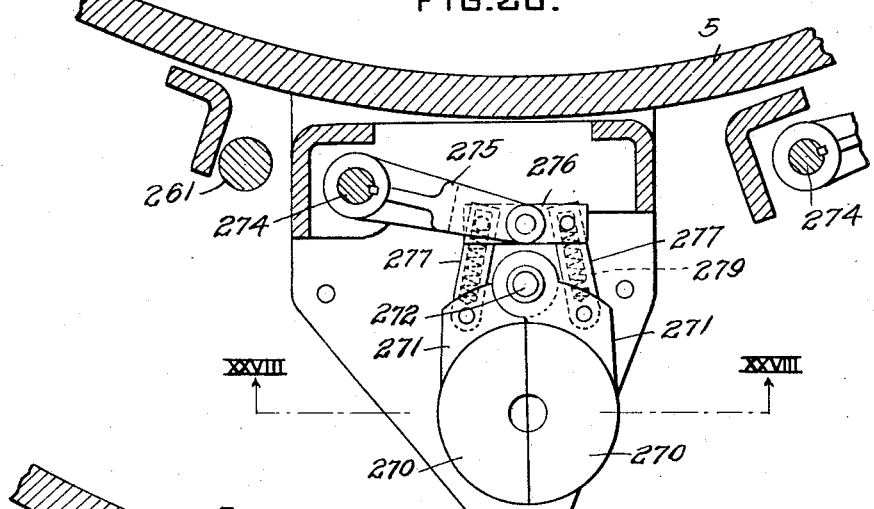
Figure 27:
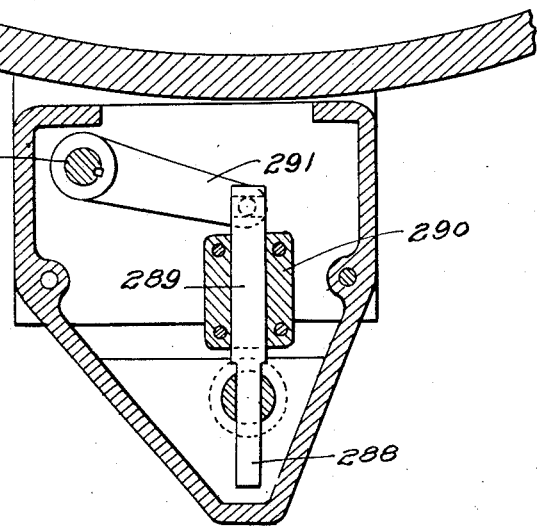
Figure 28:
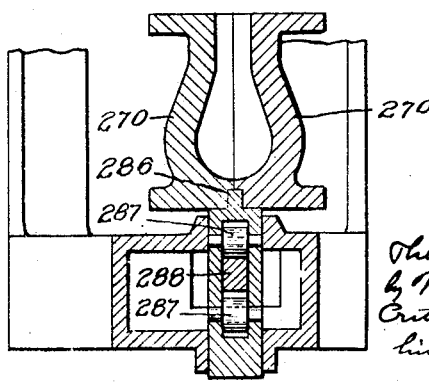
Figure 29:
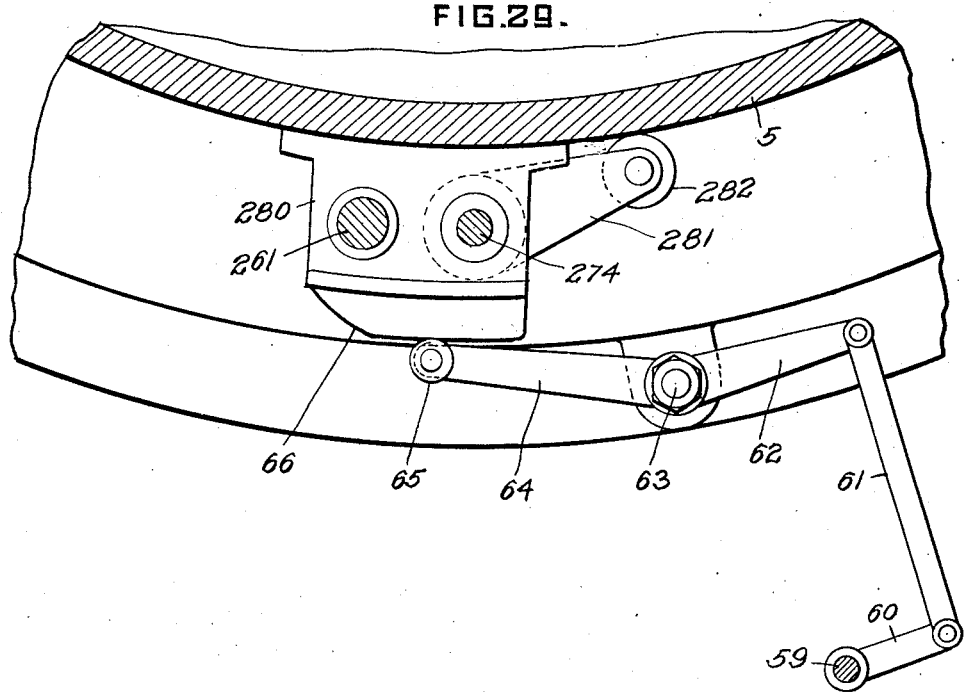
Figure 30:
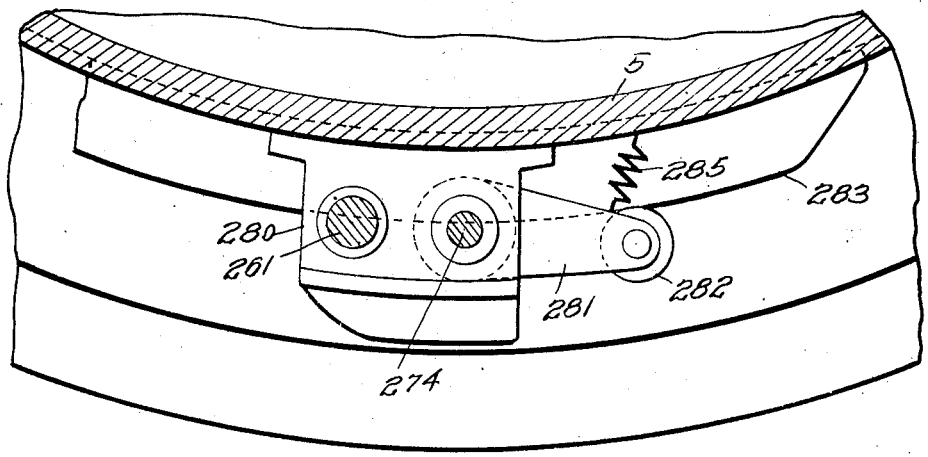

The invention is illustrated in the accompanying drawings, of which Fig. 1 is an elevation of a glass forming machine and a feeder, portions of the feeder being shown in vertical section to illustrate its construction; Fig. 2 a plan view of the machine; Fig. 3 a horizontal sectional view taken on the line III—III, Fig. 1, showing driving connections; Fig. 4 an elevation to enlarged scale of a portion of the side of the machine; Fig. 5 a vertical sectional view taken on the line V—V, Fig. 4, showing the outer portion of the machine between forming units; Fig. 6 a vertical sectional view taken on the line VI—VI, Fig. 4, showing half of the machine at the position of a forming unit; Fig. 7 a vertical sectional view corresponding to the upper left hand portion of Fig. 6, the view being to enlarged scale and showing a receiving cup in the position opposite from that shown in Fig. 6, and also showing in section mechanism for operating a blowing head; Fig. 8 a sectional view to enlarged scale taken on the line VIII—VIII, Fig. 6, showing receiving cup locking mechanism; Figs. 9 and 10 vertical sectional views taken, respectively, on the lines IX—IX and X—X, Fig. 8, showing the construction of the receiving cup mechanism; Fig. 11 an elevation of the receiving cup mechanism shown in Fig. 10; Fig. 12 a vertical sectional view taken on the line XII—XII, Fig. 8; Fig. 13 a diagrammatic view of the preferred arrangement of several cams on the turret and frame for operating the receiving cup mechanism shown particularly in Figs. 8–12; Fig. 14 a vertical central sectional view of a blowing head when turned upwardly with its several parts in the positions which they occupy when a blank is molded on the head; Fig. 15 a view similar to Fig. 14, showing the parts of a blowing head in the positions which they occupy during a puffing operation; Fig. 16 a view similar to Fig. 14 with the blowing head turned downwardly and its parts in the positions which they occupy during the final blowing operation; Fig. 17 a view similar to Fig. 16 showing the parts of the blowing head in the positions which they occupy when the chuck has been open to release a blown blank; Fig. 18 a sectional view taken on the line XVIII—XVIII, Fig. 16, showing an interference lever for controlling the puffing and blowing mechanism of the blowing head;
Fig. 19 a transverse sectional view of the lever taken on the line XIX—XIX, Fig. 18; Figs. 20 and 21 horizontal sectional views of a combined suction and air controlling valve at the center of the machine, the planes of view being indicated, respectively, by the lines XX—XX and XXI—XXI, Fig. 6; Figs. 22, 23 and 24 vertical sectional views taken, respectively, on the lines XXII—XXII, XXIII—XXIII, and XXIV—XXIV, Fig. 7, showing driving and operating connections for a blowing head; Fig. 25 a horizontal sectional view taken on the line XXV—XXV, Fig. 7, showing driving and operating connections for a blowing head; Figs. 26 and 27 horizontal sectional views taken, respectively, on the lines XXVI—XXVI, XXVII—XXVII, Fig. 7, showing mold mechanism; Fig. 28 a vertical sectional view of a mold, the plane of view being indicated by the line XXVIII—XXVIII, Fig. 26; Fig. 29 a horizontal sectional view to enlarged scale taken on the line XXIX—XXIX, Fig. 4, showing a shot bolt operating cam for the receiving cups, and showing connections from the cam to the bolt; Fig. 30 a horizontal sectional view taken on the line XXX—XXX, Fig. 4, showing a mold operating cam and connections from it; Fig. 31 a diagrammatic view of the principal units of the machine showing the several positions they occupy in a complete cycle of the machine; and Fig. 32 a diagram showing the timing of most of the operating elements of the machine when adjusted for manufacturing a given article.

The machine provided according to this invention includes a frame which, among other things, supports a continuously rotatable turret provided with a plurality of equally spaced glass-forming units which move continuously with the turret. These units may, as far as concerns some features of the invention, be of various types for blowing glass articles in iron, or paste-molds, but as far as concerns other features of the invention they are for forming glass by the paste-mold process. The forming machine is coordinated with a glass feeder which may be of any desired type, but which is preferably a gob feeder of the needle-shear type. The continuously rotating turret is provided with a plurality of cups for receiving glass from the glass-delivery apparatus, each cup being adapted to normally move with the turret in registration with the one of its forming units. Provision is made for holding each of the cups in succession stationary at the delivery station for receiving glass and for subsequently causing it to move with the turret in registration with one of the forming units which succeeds or follows that with which the receiving cup was previously in registration. Preferably the receiving cups are arranged above the forming units, and when so arranged, the machine includes provision for turning each cup downwardly to deliver its received glass to a forming unit, suction means being provided to hold the glass in the cup until it is delivered to the forming unit. When the forming units are of the paste-mold type, the receiving cups are also parison molds, and provision is made for moving them towards the blowing heads of forming units to mold parisons on them. In the preferred embodiment of the invention each forming unit includes a blowing head and a cooperating blow mold, and the blowing head is mounted for rotation on a horizontal axis to place the glass in its cooperating blow mold. To prepare a paste-mold blank from a parison molded upon the upper end of a blowing head, provision is made for rotating the blowing head on its longitudinal axis and for puffing a blank at such intervals as may be required to properly prepare it for blowing.

Referring now to the illustrative embodiment of the machine, the entire structure, except the glass delivery mechanism, is borne by a frame including a base 1 (Fig. 6) a central drum or inner frame 2 and an outer frame 3 borne by standards 4 attached to base 1. Surrounding drum 2 there is a turret 5 which, among other things, carries glass-forming units for continuous movement with it, each of which may, as previously stated, include a blowing head 6 and a blow mold 7. For continuously rotating the turret, its lower end is provided with a worm wheel 8 which meshes with a worm 9 attached to a shaft 10 (Figs. 3 and 6) adapted to be driven in the manner presently to be explained. At the top of turret 5 between the blowing units there are posts 11 (Fig. 5) which support a guide frame 12 forming part of the turret, which frame is provided with a plurality of receiving cups 13 movable with and with relation to the turret.

The base 1 of the machine may be provided with truck wheels 14 (Fig. 1) adapted to ride upon rails 15, so that the machine may be moved to and from a source of glass supply, as for example a fore-hearth 16 of a glass melting tank. Glass is preferably delivered from the fore-hearth to receiving cups 13 by means of a vertically reciprocable needle 17 adapted to control flow through an orifice 18 in the bottom of the fore-hearth, the needle being so reciprocated that gobs of glass of predetermined uniform size are intermittently discharged. These gobs are intermittently cut from the source of supply by shears 19, which are operated in coordination with the reciprocation of the needle in any desired manner well known in the art.

The feeder, rather conventionally illustrated in Fig. 1, includes a vertically reciprocating shaft 20 to the upper end of which needle 17 is indirectly attached. To coordinate the operation of the forming machine with that of the feeder, a single motor 21 is provided for operating the feeder and for driving shaft 10 which rotates turret 5. As shown in Fig. 1, this motor drives a shaft 22 which is suitably geared to a rotatable shaft 23 forming part of the feeder and to turret driving shaft 10. The connections for driving shaft 23 include a worm 24 and a worm wheel 25 attached to such shaft, and the connections for driving shaft 10 include pinions 27 and 28, a shaft 29, pinions 30 and 31, a shaft 33 and pinions 34 and 34ª, (Fig. 3) the latter of which is attached to shaft 10. The rotation of feeder shaft 23 imparts reciprocation to needle 17 by means of a cam 32 attached to shaft 23 and on which a roller at the lower end of feeder shaft 20 bears. These coordinated driving connections are such that a gob of glass is fed to each one of the receiving cups 13 while the turret is moved an angular distance equal to the spacing of the forming units.

Receiving cups.

In the illustrative embodiment of the invention the machine is provided with fifteen forming units and sixteen receiving cups, the latter being slidably mounted in guideway 12 (Fig. 5) at the top of the turret. The machine may, however, be provided with a different number of forming units, and, if each forming unit does not effect a glass-forming operation upon each revolution of the turret, it is not necessary to provide a greater number of receiving cups than forming units. The turret is provided with a plurality of latches to engage each receiving cup mechanism when in registration with a forming unit, and the outer frame of the machine is provided with a latch to engage each receiving cup mechanism when at the glass delivery station, at which time the turret latch for engaging the receiving cup mechanism is released. Outer frame 3 is provided with a cam for turning the receiving cups from their upward glass-receiving to their downward glass-discharging position, and for again turning them upwardly, and is also provided with a cam for causing a downward longitudinal movement of the receiving cups to mold parisons upon blow heads. The turret is also provided with a cam for vertically reciprocating each receiving cup while it is receiving glass, particularly when receiving glass from a continuous flow orifice. With this general explanation of the arrangement and operation of the receiving cups, their detailed constructions may be better understood. Each receiving cup being the same, the ensuing description will be confined to but one of them.

Each receiving cup 13 (Fig. 10) is mounted for longitudinal movement in a frame 36. Interiorly the receiving cup is shaped to mold at the end of a blowing head a parison of desired form. Frame 36 is mounted on a hub 37 for rotation on a horizontal axis, such hub being attached to or forming a part of a plate 38 which is slidably mounted in guideway 12. To the lower end of plunger shaft 35 there is pivotally attached by a slotted connection an arm 39 which is pivotally mounted on a bracket 40 extending downwardly from frame 36 as such frame is viewed in Figs. 10 and 11. Midway between its ends arm 39 is provided with a horizontally disposed pin 41 provided at its ends with rollers 42 and 43 (Fig. 12) adapted to be engaged by cams for swinging arm 39 on its pivot point to move plunger shaft 35 longitudinally, as will presently be explained. For rotating frame 36 on hub 37 the outer vertical face of such frame is provided with a pair of horizontally spaced rollers 44 and 45 adapted to be engaged by cam slots borne by outer frame 3.

For causing each receiving cup mechanism to normally move with the turret in registration with a forming unit, plate 38 (Fig. 8) which is slidably mounted in guideway 12 is provided with a notch 46 adapted to be engaged by a latch 47 attached to the upper end of a rod 48 which is rotatably mounted on the inner side of and moves with turret 5. This rod is provided at its lower end with a finger 49 (Figs. 5 and 8) adapted to be engaged by a cam 50 attached to inner frame 2 adjacent to the glass delivery or charging station. Normally latch 47 is urged towards and into engagement with a notch 46 by means of a spring 51 which acts between an arm 52, attached to latch 47, and an abutment 53. As each receiving cup approaches the glass delivery station, the outer end of arm 49 is engaged by cam 50 to remove latch 47 from notch 46 so that the receiving cup supporting plate 38 is then free to slide in guideway 12.

For holding a receiving cup stationary at the delivery station and thus cause it to slide in guideway 12, the outer frame of the machine is provided with a horizontally movable shot bolt 54 (Fig. 8) normally urged towards the receiving cup mechanism by a spring 55 which acts between the shot bolt and the outer end of a frame 56 in which such bolt is slidably mounted. When in its inward position the shot bolt lies in the path of a lug 57 attached to the outer end of hub 37 so that when such lug reaches and is engaged by the shot bolt the receiving cup is held stationary at the delivery station and slides in guideway 12. For removing the shot bolt to permit the receiving cup to again move with the turret in registration with a succeeding forming unit, such bolt is engaged by a finger 58 attached to the upper end of a rod 59 (Figs. 4, 8 and 29). At its lower end rod 59 has attached to it an arm 60 which is connected by a link 61 to an end 62 of a lever which is pivoted to the frame at 63, and the other end 64 of which is provided with a roller 65 intermittently engaged by a series of cams 66 borne by and movable with the turret. Cams 66 are so spaced that the shot bolt is withdrawn when the receiving cup mechanism is in registration with a succeeding forming unit, and at the same time a latch 47 is released to engage the notch 46 on plate 38 so that the receiving cup mechanism will travel with the turret in registration with the forming unit.

In case glass is delivered to the receiving cup through a continuous flow orifice it is desirable to move the receiving cup upwardly when the glass begins to flow into it and then downwardly just prior to the shearing of the stream of glass. For this purpose the outer face of the turret, which then moves relatively to the receiving cup, is provided with cams 70 and 71 (Fig. 12) adapted to engage roller 43. These cams are shown diagrammatically in Fig. 13, cam 70 being arranged in advance of cam 71 so that when the turret to which the cams are attached moves to the left, as indicated by the arrow 72 on cam 70, roller 43 is first moved upwardly by cam 70 to raise the receiving cup, and then downwardly by cam 71 to lower the cup and produce a necking of the stream of glass.

As soon as a receiving cup has received its charge of glass and has been released by the shot bolt 54 and engaged by a latch 47, the movement of the receiving cup by the turret is utilized to cause the receiving cup to turn on its horizontal axis to bring it in registration with the top of a blow head. For this purpose outer frame 3 is provided with grooves formed between suitable plates 75 and 76 (Fig. 7) which are adapted to receive rollers 44 and 45 (Fig. 8) attached to the outer vertical face of cup frame 36 as previously explained. The cam groove 77 formed between these plates is diagrammatically represented in Fig. 13, and the paths which rollers 44 and 45 follow in effecting a quick turnover of a receiving cup are designated by the dot-and-dash lines 78 and 79, respectively. It will be observed that roller 45 enters slot 77, and that, when it follows such slot to its bottom, roller 44, which does not enter the slot, takes a position in advance of roller 45. To again turn a receiving cup to its upward glass-receiving position, outer frame 3 is provided with a cam groove 80 (Fig. 13) formed between plates 81 and 82. Roller 44 enters this groove and follows the path indicated by the dot-and-dash line 83, and roller 45 remains below the groove and follows the dot-and-dash line 84. This return movement of the receiving cup, which need not be accomplished quickly, is preferably effected just prior to the time the receiving cup reaches the delivery station.

After a receiving cup has been turned downwardly in registration with the upper end of a blowing head, its plunger shaft is moved downwardly to press the glass upon the end of the head. For this purpose, outer frame 3 is provided with a plate 85 (Fig. 13), the lower face 86 of which engages roller 42 of lever 39 as the receiving cup mechanism is moved to the left as viewed in Fig. 13. An upward movement of the receiving cup after the glass has been molded upon the blow head is effected by the upper face 87 of a plate 88 which is also attached to cam plate 3.

To hold cup plunger shaft 35 normally in the position indicated in Figs. 10 and 11, frame 36 is provided with a slidably mounted latch 90 yieldingly pressed towards plunger 35 by a spring 91, the outer end of the latch being of conical form adapted to be received by a notch 90ª formed in the face of the plunger 35. Furthermore, to hold the receiving cup in its alternate glass-receiving and glass-discharging positions, the receiving cup frame may be provided with a stop 92 (Fig. 8) adapted to engage stops 93 and 94 borne by plate 38.

Each receiving cup mechanism includes provision for the creation of a partial vacuum in its bottom while the cup is being filled with glass and until it is turned over to place the glass upon the top of a blowing head. As seen in Fig. 10, the base of receiving cup 13 is provided with a plurality of openings or slots 100 which communicate with a passageway 101 formed centrally in plunger shaft 35. The bottom of this passageway communicates through a flexible pipe 102 with an annular space 103 in receiving cup frame 36 surrounding hub 37, which hub is provided centrally with a passageway 104 communicating at its outer end through a lateral port 105 with space 103. The inner end of passageway 104 communicates through a lateral port 106 with a passageway 107 formed in plate 38 (Fig. 8), which in turn communicates with a pipe 108 (Fig. 12) leading to a suction line, the construction of which will presently be explained. In the top of receiving cup frame 36, as viewed in Figs. 10 and 12, there is a block 109, the inner end of which projects into the annular space 103 surrounding hub 37 and is shaped to conform to the surface of the hub. This block is pressed towards the hub by a spring 110, which bears at its outer end against a plate 111 attached to frame 36. When a receiving cup is turned downwardly to mold its supply of glass upon a blowing head, the outer end of port 105 in hub 37 is closed by block 109 to interrupt communication between the suction line and the bottom of the receiving cup. Normal leakage in the suction conduit between annular space 103 and the receiving cup soon breaks the partial vacuum in such conduit so that the body of glass may be delivered to a blowing head.

Reference has heretofore been made to the provision of one receiving cup mechanism in addition to the number of forming units carried by the turret. The purpose of this may be understood by reference to Fig. 8 which shows three receiving cup mechanisms conveniently designated as A, B and C. Mechanism A at the left of the figure is at the glass-receiving station and is engaged by shot bolt 54 so that it remains stationary while the turret continues to revolve. Mechanism B is adjacent to mechanism A, and is being pushed along guideway 12 by plate 38 of mechanism A. Furthermore, mechanism B is the next to be engaged by shot bolt 54. Mechanism C is in registration with a forming unit, and is being moved with and by the turret towards glass-receiving position, turret latch 47 engaging plate 38 of this mechanism.

When the turret moves to bring the outer end of the latch 47 which is immediately to the right of mechanism A to a position for engaging notch 46 of mechanism A, this latch 47 is released simultaneously with the withdrawal of shot bolt 54, so that mechanism A then moves with the turret in registration with a forming unit. After lug 57 at the outer end of hub 37 of mechanism A has passed beyond the shot bolt, such bolt is released so that it is in a position to engage lug 57 of mechanism B, which is then being pushed forwardly to glass-receiving position by mechanism C. When lug 57 engages mechanism B latch 47 is withdrawn from mechanism C, mechanism B remains stationary at the glass-receiving station, and mechanism C is pushed along guideway 12 by mechanism B. This cycle of operation continues as the receiving cups are brought one after another to glass-receiving position, and from this it will be seen that glass is charged into each receiving cup while the turret moves an angular distance equivalent to about one-half of the angular spacing of the forming units.

That the plates 38 of the receiving cup mechanism may be properly held in guideway 12 and their sliding movements in the guideway facilitated, the top and bottom of the plates forming the guideway are provided with grooves 115 and 116 (Fig. 12), and each plate 38 has attached to it a bar 117 provided at its outer ends with rollers 118, (Figs. 8, 9 and 12). Adjacent plates 38 have their bars 117 attached to opposite horizontal faces so that there may be a proper nesting of the plates and their attached roller bars 117 when the receiving cup mechanisms are in contact with each other at the glass-delivery station, as seen in Fig. 9.

With the foregoing explanation of the manner in which the receiving cups are set back when at the glass-delivery station, the construction of the suction lines leading to the receiving cups may be understood from the following: At the center of the machine there is a suction line and air supply valve mechanism preferably constructed as shown in Figs. 2, 6, 20 and 21, the latter two figures being horizontal sectional views of the valve mechanism. As shown, this mechanism includes a central barrel-shaped casing 119 which is held against rotation with the turret by pipes, presently to be explained, which extend downwardly into and are attached to this casing. The outer face of the upper portion of casing 119 is provided with an annular groove 121 in communication with a pipe 125 attached to the casing and leading to a suction mechanism not shown. For closing groove 121, the outer face of casing 119 is surrounded by a conically-shaped ring 122 to which there are attached the inner ends of flexible pipes 123 extending one to each of the suction lines 108 which are attached to the receiving cup mechanisms. Ring 122 is slidably mounted upon casing 119, its inner face having merely frictional engagement with the outer face of the casing. Therefore, when a receiving group is moved backwardly with relation to the turret at the glass-receiving station, the flexible conduit 123 which connects it to sliding ring 122 becomes slackened.

Since there are sixteen receiving cups having flexible pipe connections to ring 122, and since there are fifteen mold mechanisms spaced at uniform intervals on turret 5, ring 122 rotates during each revolution of the turret twenty-two and a half degrees less than a complete rotation. The flexible pipe 123 which connects ring 122 with the receiving cup in registry with the blowing mechanism adjacent to and approaching the filling station is taut, and accordingly pulls upon the ring, until its latch 47 releases it. The flexible pipes connected to succeeding cups have progressvely increasing slackness. The net result of this arrangement is that ring 122 steps back one and one-half degree each time a cup is filled, the frictional engagement of valve casing 119 with the ring causing the ring to effect this stepping back.

*Operation of receiving cup mechanism.*

In explainng this, the various movements of one receiving cup will be described beginning with the mechanism just as it reaches the glass-delivery station and is engaged and held stationary by shot bolt 54. If glass is fed to the cup by a gob feeder, which is the preferred arrangement, the cup need not be moved vertically while becoming filled or charged. If filled from a continuous flow orifice, the receiving cup is first moved upwardly by the engagement of roller 43 by a cam plate or block 70 (Figs. 12 and 13) on the outer face of turret 5. Near the end of the charging operation the cup is moved downwardly by an oppositely arranged cam plate or block 71 also borne by the turret. During the filling of the cup, suction is created in its bottom through passageway 101 extending through cup plunger shaft 35 (Fig. 10), which passageway is connected to the suction line in the manner shown in Figs. 8 and 10, and previously explained. When the receiving cup is filled and the turret has been moved to bring the filled cup mechanism in registration with a succeeding forming unit, shot bolt 54 is released and a turret latch 47 engages plate 38 of the mechanism to cause it to move with the turret.

The initial movement of the receiving cup with the turret results in the turning of receiving cup frame 36 through an angle of 180°, such turning being effected by the groove formed between plates 75 and 76 on outer frame 3 (Fig. 13). This brings the outer edge of the receiving cup adjacent to and in alignment with the upper end of a blowing head, and also results in breaking communication of the bottom of the cup with the suction line. This communication is broken by the outer end of port 105 (Fig. 10) being closed by spring-pressed block 109. The continued movement of the turret first causes the receiving cup to move downwardly to press or mold its contained glass upon the top of the registering blowing head, and then to move upwardly to permit the blowing head to perform its cycle of operation. These movements of the receiving cup are effected by plates or cams 85 and 88 (Fig. 13) borne by outer frame 3, which cams engage roller 42 (Fig 12) of the receiving cup mechanism. After the glass has been molded upon a blowing head and the receiving cup has been thus moved upwardly, the entire receiving cup mechanism continues to move idly with the turret until it again closely approaches the glass-delivery station, at which time it is turned upwardly to glass-receiving position by means of groove 80 formed between plates or cams 81 and 82 (Fig. 13). By thus keeping the receiving cup in its downward position during most of its travel with the turret, the suction line is closed by block 109 (Fig. 10) until shortly before it again receives glass As each receiving cup approaches the glass-delivery station, the turret latch 47 which engages it is released, so that such cup may be slid backwardly in guideway 12, first by being engaged by the preceding receiving cup and then by being engaged by shot bolt 54, as has been previously fully explained in connection with the three receiving cup mechanisms A, B and C shown in Fig. 8.

Blowing head.

As already explained, the turret is provided with a plurality of forming units, each of which in the preferred embodiment of the invention includes a blowing head and a mold for the manufacture of glass-articles by the paste-mold process. The blowing heads are arranged above the molds, each is mounted for rotation on a horizontal axis, and provision is made for rotating each on its longitudinal axis. Furthermore, each blowing head includes valve mechanism for controlling the puffing and final blowing of a blank. In the ensuing description the construction of the blowing head will first be explained, and thereafter the construction of the mechanism and driving connections for operating it.

Each blowing head 6 is attached to the outer end of a trunnion 130 (Fig. 7) mounted for rotation on a horizontal axis in a bearing 131 supported by the upper end of turret 5. Arranged axially within the trunnion there is a rotatable tubular driving shaft 132 provided at its outer end with a bevel pinion 133 which meshes with a pinion 134 forming a part of the blowing head. Within tubular shaft 132 there is a rod 135 mounted for longitudinal movement within and rotation with such shaft and connected at its outer end by a bell-crank lever 136 to a plunger shaft of the blowing head. The connection of rod 135 to lever 136 is shown in Fig. 14, and comprises a key 137 extending transversely through the outer end of rod 135 and engaging a sleeve 138 slidably mounted on tubular shaft 132, which shaft is provided with slots 139 to permit longitudinal movement of key 137. The outer face of sleeve 138 is provided with a groove which receives pins 140 carried by a yoke 141 at the inner end of lever 136.

Having reference now to the detailed construction of the blowing head, and referring particularly to Fig. 14, which shows the parts of the head in the positions which they occupy when a body of glass has been molded upon the end of the head, the head includes an outer casing 142 attached to the outer end of trunnion 130. Within the casing, which is cylindrical interiorly, there is mounted for rotation a sleeve 143, to the end of which pinion 134 is attached by bolts 144.

The outer face of sleeve 143 is provided with an annular groove 145, which, during the rotation of the sleeve, continuously communicates with an air passage 146 through casing 142, which passage in turn communicates with a flexible air supply pipe 147 connected to the air control valve at the center of the casing in the manner presently to be explained.

Immediately within sleeve 143 there is a chuck-controlling sleeve 148 having near its outer end a horizontal shoulder 149, between which and an off-set in sleeve 143, a spring 150 acts to normally urge sleeve 148 outwardly. At the inner end of sleeve 148 there is another spring 151 which also acts to press such sleeve outwardly, but spring 151 is primarily for the purpose of retaining in proper positions packings 152 which are shown at its ends. These packings prevent the escape of blowing air from the ends of an annular space 153 formed between the inner end of sleeve 148 and the central portion of pinion 134, which space communicates with groove 145 of sleeve 143 by a port 154 extending from groove 145 through sleeve 143.

The outer end of sleeve 148 is provided with a cup 155 within which there is a forming plunger 156, which plunger and cup cooperate with the outer ends of chuck fingers 157 to form the base of a blank molded on the blowing head by a receiving cup 13. Chuck fingers 157 are pivotally mounted at 158 to a ring 159 attached by bolts 160 to the outer end of casing 143. The inner ends of the chuck fingers are pivotally connected by links 161 to suitable lugs formed on the outer face of the chuck-controlling sleeve 148. By reason of this construction and mounting of the chuck fingers, inward movement of sleeve 148 draws the inner ends of the chuck fingers towards the center of the blowing head so that their outer ends spread outwardly to release a blown article.

Plunger 156 is mounted upon the outer end of a plunger shaft which includes as an integral structure a stem 162 provided with an air passageway 163, and a cylindrical tubular valve casing 164. The outer end of this valve casing is attached to a spool 165 provided externally with an annular groove 166 which receives pins 167 borne by a yoke formed at the end of a bell-crank lever 136. Thus the movement of lever 136 causes longitudinal movement of the plunger shaft, which, as stated, includes stem 162 and valve casing 164.

Within valve casing 164 there is a valve for measuring and controlling the flow of puffing air and also for controlling the flow of blowing air. This valve includes a flexible gasket 168 extending transversely of casing 164 and held by the valve lining shown within the casing. Gasket 168 is provided with a central port 169 adapted to be closed by the inner end of a stem 170 mounted for longitudinal movement within casing 164 and normally urged outwardly by a spring 171. The limit of the outward movement of stem 170 is fixed by a pin 172 extending through a slot 173 formed in the outer end of the stem, the ends of such pin being engaged by the walls of a sleeve 174, which is mounted for longitudinal movement within spool 165. The inner end of sleeve 174 is provided with a plurality of fingers 175 which bear upon gasket 168 to control final blowing. The space within valve casing 164 and on the side of gasket 168 adjacent to stem 170 communicates with annular space 153 by a port 176 through the wall of the valve casing.

Within valve casing 164 and on the opposite side of gasket 168 from stem 170, there is mounted for longitudinal movement a plug 177 which is normally urged towards the gasket by a spring 178, and which is provided with an air passageway 179 communicating at one end with port 169 in the gasket, and at its other end with the interior of casing 164. Attached to plug 177 there is a valve stem 180 provided at its end with a valve 181 which controls flow of air through a port formed centrally in a transverse gasket 182, similar to gasket 168 except that it need not be flexible.

Before explaining the operation of the blowing head, the construction of the air controlling valve at the center of the machine will be further described. In manufacturing glass articles by the paste-mold process it is desirable to first prepare a pre-formed blank or parison by intermittently puffing it with small quantities of compressed air, after which the puffed and expanded blank is blown to form in a mold. Furthermore, it is sometimes desirable that the air for puffing be at a higher pressure than that for the final blowing. Accordingly the air control valve at the center of the machine is preferably so formed as to first supply to a blowing head air at a high pressure for puffing and then air at a lower pressure for blowing.

Referring now to Figs. 6 and 21, the lower portion of valve casing 119 is provided with two segmental grooves 183 and 184 which are separated from each other at 185. High pressure air for puffing is supplied to groove 183 by a high pressure air pipe 186, and low pressure air for the final blow is supplied to groove 184 by a low pressure pipe 187. Surrounding the lower portion of casing 119 there is a ring 188 to which the inner ends of flexible pipes 147 are attached, one of such pipes leading from each of the blowing heads. Ring 188 is attached to a plate 189, which in turn is connected to the upper portion of turret 5 and accordingly rotates with the turret. Therefore, during such period of the rotation of the turret as the inner end of a flexible pipe 147 is in communication with valve groove 183, high pressure air for puffing is supplied to the blowing head to which the outer end of the flexible pipe is attached. Similarly, as long as the inner end of the flexible pipe is in communication with groove 184, low pressure air is supplied to the blowing head. The third groove places the flexible pipe in communication with the atmosphere through the port indicated in Fig. 21. The flow of both puffing and blowing air to a blank formed on the blowing head is controlled by the valve mechanism in the head as will now be explained.

Puffing is controlled by the outward movement of valve casing 164 effected by bell-crank lever 136, and by an interference lever 190 pivotally mounted on a pin 191 borne by a housing 192 attached to the blowing head casing 142. As seen in Figs 18 and 19, lever 190 may be held in one of three positions by means of a latch 193 pressed outwardly by a spring 194 against the face of a block 195 provided with suitable recesses 196 for receiving the conically-shaped outer end of the latch. In the first position of the lever it bears, by projection 197 formed on its inner face, upon the outer end of stem 170 to prevent such stem from moving outwardly when bell-crank lever 136 moves valve casing 164 outwardly to effect puffing. In the second or intermediate position of the lever, it bears, by lugs 198 formed on its inner face, upon the outer end of a flange 199 projecting laterally from sleeve 174. These lugs are beveled at their ends so that when the lever is moved to its intermediate position they may press flange 199 inwardly to effect final blowing, and this without moving stem 170 inwardly. In the third position of the lever it lies entirely at one side of the outer ends of stem 170 and sleeve 174 of the blowing head so that the plunger shaft may be moved to open the chuck fingers. The interference lever is moved from one to the other of its several positions by means of cams 200 borne by outer frame 3, which cams successively engage rollers 201, 201ª and 201ᵇ at the outer end of the interference lever when the blowing head is turned downwardly. Similar cams again restore the lever to its first position after the blowing head has been turned upwardly prior to the forming of a blank or parison upon its upper end.

*Operation of blowing head.*

During its cycle of operation the blowing head and the various parts entering into its construction occupy four positions, first, for receiving a body of glass or blank at its upper end, second, for puffing the blank, third, for the final blowing of the blank, and fourth, for releasing a blown article. These several positions of the blowing head and its parts are shown, respectively, in Figs. 14, 15, 16 and 17.

In the blank-receiving position illustrated in Fig. 14 the plunger end of the blowing head is uppermost, plunger 156 is held in its uppermost position by bell-crank lever 136, interference lever 190 is in the position to cause its projection 197 to be immediately below the lower end of valve stem 170, and valve 181 is closed. Chuck controlling sleeve 148 is in its uppermost position, being held there by spring 150, and plunger head 156 is above the base of cup 155. The plunger controlling sleeve 148 is held in this position against the action of spring 150 by reason of the inner faces of chuck jaws 157 being pressed against the outer face of the upper end of cup 155, and therefore incapable of further closing movement, and accordingly locking the sleeve against further upward movement. Furthermore, in this position of the blowing head high pressure puffing air is supplied to the measuring valve, or in other words to the chamber within which plug 177 lies, the line of communication from the air control valve 119, 188 at the center of the machine being through flexible conduit 147, annular groove 145 in the outer face of sleeve 143, port 154 through said sleeve, annular space 153 surrounding valve casing 164, port 176 through the valve casing, port 169 through gasket 168 and port 179 through plug 177.

For puffing a blank, valve casing 164 is moved outwardly by bell-crank lever 136 to the position shown in Fig. 15. This causes plunger 156 to be withdrawn from the inner face of the formed blank to permit air to act on the base of the blank. Valve stem 170, being held against outward movement by projection 197 on interference lever 190, this movement of valve casing 164 also causes gasket 168 to press against the inner end of valve stem 170, which not only closes port 169 through such gasket, but presses the gasket towards the plunger in the manner indicated with the result that plug 177 is moved toward the plunger to unseat valve 181 from gasket 182. Valve 181 being thus opened, and port 169 of gasket 168 being closed by the end of stem 170, the high pressure air in the valve casing between gaskets 168 and 182 flows through the port in gasket 182 and through passageway 163 in plunger rod 162 to act upon the inner face or base of the blank. A subsequent inward movement of valve casing 164 by bell-crank lever 136 returns the parts of the blowing head to the positions which they occupy in Fig. 14 so that blowing air may again flow through port 169 of gasket 168 to fill the measuring chamber. Thereafter casing 164 may again be moved outwardly to effect a further puffing by a measured quantity of air which may be varied by changing its initial pressure. The valve casing may be so moved to effect as many puffs as is desired in the course of preparation of a blank for blowing before, during and after the downward turning of the blowing head, and such movements of the valve casing have no effect upon the chuck fingers, because chuck controlling sleeve 148 is not moved inwardly until the plunger shaft has been moved inwardly to such point that its base engages the seat at the outer end of the chuck-controlling sleeve.

When in position for blowing the blank in a mold, the blowing head is turned downwardly as shown in Fig. 16, and interference lever 190 is moved to the second of its positions in which its projections 198 press sleeve 174 inwardly in this position. Valve stem 170 is then in its outward position leaving port 169 of gasket 168 open, and the fingers 175 at the inner end of sleeve 174 press gasket 168 downwardly to move plug 177 for opening valve 181. A continuous supply of low pressure blowing air then flows through the valves and ports previously explained. This supply of air may be stopped by the inner end of flexible pipe 147 reaching the end of cam groove 184 (Fig. 21), or by moving valve casing 164 outwardly and holding valve stem 170 inwardly by the interference lever so that the inner end of such stem closes port 169 through gasket 168.

In the position of the blowing head shown in Fig. 17, for releasing a blown blank, interference lever 190 is at one side of the outer ends of sleeve 174 and stem 170, and the plunger shaft 162, 164 is moved to its innermost position. During this inward movement of the plunger shaft, the base of plunger 156 engages the outer end of chuck-controlling sleeve 148 and moves it inwardly against the resistance of spring 150. This causes links 161 which are connected to sleeve 148 to pull inwardly upon the inner ends of chuck fingers 157 so that their outer ends swing outwardly to release a blown article, which may fall upon a suitable conveyor for carrying it to a leer, or may be otherwise received in various ways well understood in the art.

When the blowing head is again turned upwardly to receive another blank, the parts are restored to their positions which they occupy in Fig. 14, interference lever 190 being moved to the first of its series of positions after the head is turned upwardly.

*Blowing head driving and operating mechanism.*

This includes three elements, first, means for rotating the blowing head on a horizontal axis, second, means for rotating the chuck on its longitudinal axis, and third, means for moving the chuck plunger shaft of the blow head on its longitudinal axis to effect the several operations of the blowing head just explained. These three operating elements will be explained in the order stated.

For rotating the blowing head on a horizontal axis, the inner end of the blowing head trunnion 130 (Figs. 7 and 22) has attached to it a pinion 210, and meshing with it there is a segmental pinion 211 pivoted to turret 5 and provided with an arm 212 having a roller 213 adapted to be engaged by a cam groove formed between bars 214 attached to inner frame 2. This cam groove is so shaped that, as the turret rotates, segmental pinion 211 is caused to rotate and thereby turn the blowing head downwardly at such rate as may be desired for the manufacture of any particular article, and to subsequently turn the blowing head upwardly to receive a body of glass.

The blowing head is preferably locked in its alternate positions, and for this purpose a latch 215 (Figs. 7, 22 and 25) is pivotally mounted at 216 on the inner face of turret 5, the latch being adapted to engage notches 217 formed on the periphery of a disk 218 attached to the inner face of pinion 210. This latch is normally urged towards notch-engaging position by a spring 219 arranged between an arm 220 of the latch and a lug 221 attached to the upper portion of the turret. To release the latch prior to the rotation of the blowing head on its horizontal axis, the latch is provided with an arm 222 having a roller 223 adapted to be engaged by blocks or bars 224 attached to the outer face of central frame 2. One block is arranged to release the latch before roller 213 of segmental pinion 211 engages the cam groove between the bars 214 for turning the blowing head downwardly, and the other block for similarly releasing the latch before the blowing head is turned upwardly.

The rotations of the blowing head chucks are preferably effected by a motor 225 (Fig. 6) attached to the lower face of a plate 226 which forms a top for frame 2. This motor is suitably geared, as shown in Fig. 6, to a vertical driving shaft 227 arranged at the center of frame 2 and provided at its upper end with a bevel pinion 228 with which there mesh bevel pinions 229 attached to the ends of rods 230, one of which is provided for each blowing head, and all of which are continuously rotated. As seen in Figs. 7 and 23, rod 230 has a pinion 231 feathered to it for longitudinal movement upon the rod and for rotation with it. Attached to the side of pinion 231 there is a spool 232 provided with a groove 233 engaged by rollers 234 which are attached to the outer ends of arms 235 extending horizontally from a rod 236 pivotally mounted in the upper part of turret 5. The lower end of rod 236 is provided with an arm 237 having a roller 238 which bears against the inner face of a cam bar 239 attached to the upper face of plate 226 of the center frame. A spring 240, arranged between spool 232 and a ring 241 attached to rod 230, normally urges pinion 231 into mesh with a pinion 242 attached to the inner end of tubular driving shaft 132. During such period of the complete cycle of a blowing head as it is desired to have the chuck idle, that is to say not rotating, cam bar 239 presses arm 237 inwardly to release pinion 231 from mesh with pinion 242, the general arrangement of cam blocks 239 for this purpose being indicated in Fig. 25.

Having reference now to the means for reciprocating rod 135, (Fig. 7) to move bell-crank lever 136 for imparting longitudinal movement to the plunger shaft, the inner end of rod 135 is mounted for longitudinal movement in a sleeve 245 which is provided at its central portion with an inwardly extending channel or ring 246 which ring forms an abutment for the inner end of a spring 247 acting between it and a nut 248 at the inner end of rod 135. This spring normally urges the rod inwardly. The limit of its inward movement is fixed by a shoulder 249 attached to the rod and adapted to abut at its inner end against the outer face of ring 246. As seen in Figs. 7 and 24, the position of rod 135 is determined, and its movements are effected, by a yoke 250 provided with rollers 251 which engage the outer face of ring 246, such yoke being pivotally mounted on a vertical shaft 252 borne by the turret, and being provided also with a roller 253 which lies in a cam groove 254 formed between bars 255 on the upper face of plate 226 of the frame. By mounting rod 135 for longitudinal movement in sleeve 245, and urging such rod inwardly by a spring 247 in the manner explained, a resilient connection is afforded which prevents breakage of or injury to any of the parts connected to shaft 135 in case something, as for example a piece or body of glass, should prevent the normal closing of the chuck fingers of the blowing head.

It will be understood from the description of the operation of the blowing head that cam groove 254 is formed to effect movements of chuck plunger shaft 162, 164, both for puffing a blank and for opening and closing chuck fingers 157 at the outer end of the blowing head.

Mold mechanism.

The turret is provided with a plurality of molds 7, one for each blowing head, which may be of various types and sizes depending upon the particular articles desired to be manufactured by the machine. To properly position different types and sizes of molds with relation to the blowing head, the molds are supported by a ring 260 (Fig. 4–7) which is mounted for vertical movement upon the outer face of turret 5. As shown particularly in Figs. 4 and 5, ring 260 is supported by a plurality of vertical rods 261 which are held at their ends against rotation. Intermediate their ends these rods are threaded to receive a sleeve 262 which is held against longitudinal movement with relation to ring 260 by brackets 263. One of these sleeves is provided with a pinion 264 which meshes with a pinion 265 attached to the inner end of a shaft 266 which may be turned by a crank, and all of the sleeves are provided with sprocket wheels 267 which are connected for simultaneous rotation by a sprocket chain 268. Thus by turning shaft 266 in one direction or the other, mold supporting ring 260 may be uniformly moved upwardly or downwardly upon the outer face of turret 5.

The molds shown in the drawings are for the manufacture of electric lamp bulbs. As seen particularly in Figs. 7, 26 and 28, each is formed of two parts 270 provided with arms 271 which are pivotally mounted on a vertical axis on upper and lower pins 272 and 273 supported by ring 260. Adjacent to the mold there is a vertical shaft 274 adapted to be rocked in a manner presently to be explained. Feathered upon this shaft for rotation with and vertical movement upon it, there is an arm 275 which is pivotally connected at its outer end to the center of a horizontal bar 276. The outer ends of this bar are connected by links 277 to the arms 271 at the rear of mold parts 270, to avoid injury to or breakage of the mold opening and closing mechanism, links 277 are preferably provided with springs 279 against which the outer ends of bar 276 act to close a mold. The inner ends of these links are closed so that bar 276 may act directly upon the links to open a mold.

Shaft 274 extends downwardly through ring 260 in such a manner that the ring may move vertically upon the shaft, and the lower end of the shaft is rotatably mounted in a block 280 (Fig. 30) attached to the lower portion of the turret. At the lower end of the shaft there is attached an arm 281 provided at its end with a roller 282 adapted to be engaged by a cam 283 carried by a shelf 284 (Fig. 6) which is attached to base 1 of the machine frame. This cam presses arm 281 outwardly to turn shaft 274 in a direction to close a mold, and is normally urged in the opposite direction by a spring 285 to open a mold and hold it open. As seen in Figs. 29 and 30, blocks 280 also serve both to hold cams 66 for operating shot bolt 54 (Fig. 8), and to receive the lower ends of rods 261 which adjustably support ring 260.

For centering the two mold parts 270 when they are closed, a vertically movable rod 286 is arranged below the mold, the meeting faces of the bottom of which are provided with recesses adapted to receive the upper end of the rod. In molds for forming some articles, the bottom of the mold may be attached to the upper end of rod 286, and when this is done it is desirable to provide means for lowering the rod when the sides of the mold are swung outwardly, and for again raising the rod when the mold is closed. For this purpose rod 286 is provided with a pair of rollers 287 (Fig. 7) between which there is arranged a downwardly inclined end 288 of a bar 289 slidably mounted for horizontal longitudinal movements in a bracket 290 attached to ring 260. The inner end of bar 289 is pivotally attached by a slotted connection to the outer end of an arm 291 (Fig. 27) which is feathered to rock shaft 274 so that the arm may slide vertically on said shaft when ring 260 is moved vertically. By reference to Figs. 26 and 27 it will be seen that the rotation of shaft 274 to open the mold parts 270 causes bar 289 to move inwardly to lower rod 286, and that the reverse movement of shaft 274 closes the sides of the mold and raises the rod.

Coordinated operation of the machine.

The operation of each of the several elements of the machine has been explained either in connection with or subsequent to the description of its construction. There remains, therefore only the necessity of describing the coordinated operation of the machine for the production of blown glass articles. For convenience, this is diagrammatically illustrated in Figs. 31 and 32. Fig. 31 shows the approximate relative positions of a receiving cup, blowing head and mold at fifteen substantially uniformly spaced points around the turret. Viewed differently, Fig. 31 shows the approximate positions of all the receiving cups, blowing heads and molds of the machine at a single time. At the left end of this series of figures the three units are shown in the positions which they occupy when a receiving cup is being filled with glass at the glass delivery station, and the remaining views, reading to the right, progressively show their changes of positions while the turret makes a complete revolution.

Fig. 32 diagrammatically represents the approximate timing of the several cams of the machine as they effect a single receiving cup and forming unit during a complete revolution of the turret. Accordingly this figure diagrammatically shows the general position of each cam, the extent of each cam's function and the order of operation of the various elements of the machine. Similar to Fig. 31, the left end of Fig. 32 represents the functioning of the cams when a receiving cup begins to be filled with glass at the delivery station.

Considering the cams, or their functions, from the top of the figure downwardly, line 301 represents the operation of the cup plunger, and shows the functioning of cam 85, 88 on frame 3, and cam 70, 71 on turret 5 (Fig. 13), and indicates, first, the upward and downward movements of receiving cup 13 while it is being filled with glass, and secondly, the downward and upward movement of the receiving cup, after it has been turned over, to mold its contained body of glass upon the upper end of a blowing head.

Line 302, representing the cup turn-over, shows that the cup turns downwardly very shortly after it has been filled with glass and that it remains in its downward position until nearly the end of a revolution of the turret, as is further shown in Fig. 31. This line represents the functioning of cams 75, 76 and 81, 82 on frame 3, Fig. 13.

Line 303 shows the operation of shot bolt 54 (Fig. 8) by cam 66 on turret 5, and indicates that the shot bolt is engaging a receiving cup while it is being filled and releases it when filled.

Line 304 shows the operation of a turret latch 47 (Fig. 8) for engaging a receiving cup mechanism, the operation being concontrolled by a cam 50 on frame 2, and indicates that such latch is released to engage a receiving cup mechanism just as the shot bolt is withdrawn from engagement of such mechanism.

Line 305 represents the longitudinal movement of a chuck plunger rod 162, 164 (Fig. 14) which is controlled by cam 255 (Fig. 7) on the upper face of the top 226 of frame 2; and line 306, which should be considered in connection with line 305, shows the positions of interference lever 190 (Fig. 18) which in part determines the functions performed by the longitudinal movement of chuck plunger shaft, the interference lever being controlled by cam 200 (Fig. 18) on frame 3. When interference lever 190 is in its first position, movements of the chuck plunger shaft result in the puffing of a blank as represented by the small depressions of line 305 near its left end. When the interference lever is in its second position the movement of chuck plunger causes the final blowing of the blank, and when the interference lever is in its third position the chuck plunger may be moved to open the chuck fingers to release a blown blank.

Line 307 represents the turn-over of a blowing head 6 as effected by cam 214 (Fig. 7) on frame 2, and line 308 represents the operation of cam 224 (Fig. 7) for controlling the blowing head locking latch 215, Fig. 22. As shown by these lines, the latch is released just after a blowing head has received a body of glass, and the blowing head is thereafter turned downwardly rather slowly and is again engaged by the locking latch. The blowing head remains in its downward position until after the final blow. Then the latch is released, and when the blowing head reaches its upward position it is engaged by the latch.

Line 309 represents first the closing and then the opening of a mold, the former being controlled by cam 283 (Fig. 6) on frame 1, and shows that the mold is closed shortly after a blowing head has been turned downwardly and is opened before the chuck plunger is operated to release a finished article.

Line 310 represents the operation of cam 239 (Figs. 7 and 25) on the top 226 of the inner frame for controlling the revolution of a chuck on its longitudinal axis, and shows that the chuck is revolved continuously from the time it receives a blank of glass at its upper end until after it has been completely blown in a mold.

It will be understood that the operation represented by Figs. 31 and 32 is merely typical of a timing of the machine for the manufacture of the given article, and that the operation may be varied by adjusting and changing the positions, configurations and lengths of the various cams, all of which are in positions for readily effecting such adjustments and changes. It is for this reason that the drawings have not been multiplied by fully showing the extent and configuration of a number of the cams. From Figs. 31 and 32 it will readily be seen that as soon as a receiving cup has been filled with glass it is turned downwardly to mold the glass upon the upper end of a blowing head. Thereafter the chuck is caused to rotate on its longitudinal axis, the blowing head is turned downwardly rather slowly and the molded blank is puffed both before and during the downward turning of the blowing head. After a sufficient period for elongation of the blank has elapsed, the mold is closed upon the blank and the final blowing of the blank follows. Thereafter the mold is opened and the chuck releases the finished article.

According to the provisions of the patent statutes, I have explained the principle and operation of my invention, and have illustrated and described what I now consider to represent its best embodiment. However, I desire to have it understood that, within the scope of the appended claims, the invention may be practiced by machines constructed differently than that particularly shown and described.

I claim as my invention:

1. In a glass forming machine, the combination with a source of supply adapted to deliver glass, of a continuously rotating turret provided with a plurality of forming units continuously movable with it, a plurality of glass-receiving cups borne by said turret and normally movable with the turret each in registration with a forming unit, means for holding each of said cups in succession stationary at the delivery station to receive glass, and means for subsequently causing each cup to move with the turret in registration with a succeeding forming unit.

2. In a glass forming machine, the combination with a source of supply adapted to deliver glass, of a frame, a continuously rotating turret provided with a plurality of forming units continuously movable with it, a plurality of glass-receiving cups borne by said turret and movable with the turret each in registration with a forming unit, means borne by said frame for successively engaging and holding each of said cups stationary at the delivery station to receive glass, and means borne by the turret for subsequently causing each cup to move with the turret in registration with a succeeding forming unit.

3. In a glass forming machine, the combination with a source of supply adapted to deliver glass, of a frame, a continuously rotating turret provided with a plurality of forming units continuously movable with it, a plurality of glass-receiving cups slidably borne by and movable with said turret each in registration with a forming unit, means borne by said frame for successively engaging and holding each of said cups stationary at the delivery station to receive glass, and means borne by the turret for subsequently locking a glass-supplied cup in registration with a succeeding forming unit for movement with the forming unit and turret.

4. In a glass blowing machine, the combination with a source of supply adapted to deliver glass, of a continuously rotating turret provided with a plurality of forming units continuously movable with it, each of said forming units including a blowing head, a plurality of glass-receiving cups borne by and movable with said turret each in registration with a forming unit, means for holding each of said cups in succession stationary at the delivery station to receive glass, means for subsequently causing each cup to move with the turret in registration with a succeeding blowing head, and means for causing said cup and head to move with relation to each other to deliver the glass from the cup to the head.

5. In a glass blowing machine, the combination with a source of supply adapted to deliver glass, of a continuously rotating turret provided with a plurality of forming units continuously movable with it, each of said forming units including a blowing head, a plurality of glass-receiving cups borne by said turret for movements in a horizontal path with the turret each in registration with one of said forming units, means for holding each of said cups in succession stationary at the delivery station to receive glass, means for subsequently causing each cup to move with the turret in registration with a succeeding blowing head, and means for causing said cup to move towards and to deliver its supply of glass to said head.

6. In a glass forming machine, the combination with a source of supply adapted to deliver glass, of a frame, a continuously rotating turret provided with a plurality of forming units continuously movable with it, a plurality of glass-receiving cups borne by said turrets above said forming units for movements in a horizontal path with the turret each in registration with one of said forming units, means borne by said frame for holding each of said cups in succession stationary at the delivery station to receive a supply of glass, and means for subsequently causing the glass filled cup to move with the turret in registration with and to deliver its supply of glass to a succeeding forming unit.

7. In a glass forming machine, the combination with a source of supply adapted to deliver glass, of a continuously rotating turret provided with a plurality of forming units continuously movable with it, a plurality of glass-receiving cups borne by said turret above said forming units for movements in a horizontal path with the turret each in registration with one of the forming units, means for holding each of said cups in succession stationary at the delivery station to receive a supply of glass, means for subsequently causing each cup to move with the turret in registration with a succeeding forming unit, and means for turning the cup on a horizontal axis to deliver its supply of glass to said registering forming unit.

8. In a glass blowing machine, the combination with a source of supply adapted to deliver glass, of a continuously rotating turret provided with a plurality of forming units continuously movable with it, each of said forming units including a blowing head, a plurality of glass-receiving cups borne by said turret above said heads for movements in a horizontal path with the turret each in registration with one of the forming units, means for holding each of said cups in succession stationary at the delivery station to receive a supply of glass, means for causing said cup to move with the turret in registration with a succeeding blowing head, and means for turning said cup on a horizontal axis and moving it vertically toward said registering head to deliver its supply of glass thereto.

9. In a glass blowing machine, the combination with a source of supply adapted to deliver glass, of a continuously rotating turret provided with a plurality of forming units continuously movable with it, each of said forming units including a blowing head, a plurality of glass-receiving cups borne by said turret above said heads for movements in a horizontal path with and with relation to the turret, means for holding each of said cups in succession stationary at the delivery station to receive a supply of glass, means for subsequently causing said cup to move with the turret in registration with a succeeding blowing head, means for turning the cup on a horizontal axis to deliver its supply of glass to said blowing head, and suction mechanism for holding the glass within the cup until delivered to the blowing head.

10. In a glass blowing machine, the combination with a source of supply adapted to deliver glass, of a continuously rotating turret provided with a plurality of forming units continuously movable with it, each of said forming units including a blowing head, a plurality of glass-receiving and parison-forming cups borne by said turret for movements in a horizontal path with the turret each in registration with one of said blowing heads, means for holding each of said cups in succession stationary at the delivery station to receive a supply of glass, means for subsequently causing said cup to move with the turret in registration with a succeeding blowing head, and means for then causing each cup to move towards said registering head to mold its supply of glass on the end of the head to form a parison for blowing.

11. In a glass forming machine, the combination with a source of supply adapted to deliver glass, of a frame, a continuously rotating turret provided with a plurality of forming units continuously movable with it, a plurality of receiving cups slidably borne by said turret for movements in a horizontal path with and with relation to the turret, latches borne by the turret to engage said cups for moving them with the turret in registration with forming units, a latch borne by said frame for successively engaging and holding said cups stationary at the glass delivery station, and means for releasing a turret latch while said frame latch is engaging a cup.

12. In a glass forming machine, the combination of a frame, a continuously rotating turret provided with a plurality of forming units, a plurality of receiving cups mounted on the turret for independent movements in a horizontal path with relation to the turret and for rotation on horizontal axes and for movements in a horizontal path with the turret each in registration with a forming unit, means for holding each cup stationary for receiving glass, means thereafter effective for causing the cup thus held to move with the turret in registration with a subsequent forming unit, and a cam borne by said frame for rotating said cup on its horizontal axis to deliver its contained glass to its registering forming unit.

13. In a glass blowing machine, the combination of a frame, a continuously rotating turret provided with a plurality of forming units each including a blowing head, a plurality of receiving cups mounted on the turret above said blowing heads for movements with and with relation to the turret, latches borne by the turret to engage said cups for moving them with the turret, a shot bolt borne by said frame for successively engaging and holding said cup stationary for receiving supplies of glass, a cam borne by the frame for rotating each cup on a horizontal axis to bring it in registration with a blowing head, and a cam borne by the frame for moving each cup downwardly to mold its supply of glass on a registering blowing head.

14. In a glass blowing machine, the combination of a rotatable turret provided with a plurality of forming units each including a blowing head; each blowing head comprising a casing, a chuck rotatably borne by the casing, and an air-measuring valve adjacent to and communicating with the chuck; and means effective during the rotation of said turret for intermittently operating the measuring valves of the blowing heads to puff blanks of glass engaged by the rotatable chucks.

15. In a glass blowing machine, the combination of a rotatable turret provided with a plurality of forming units each including a blowing head; each blowing head comprising a casing, a chuck rotatably borne by the casing, an air measuring valve adjacent to and communicating with the chuck, and a blank-shaping plunger mounted for longitudinal movement within the casing; means for moving said plungers longitudinally, and means responsive to said movements of the plungers for operating said measuring valves to puff blanks of glass engaged by the chucks.

16. In a glass blowing machine, the combination of a rotatable turret provided with a plurality of forming units each including a blowing head; each blowing head comprising a casing, a chuck rotatably borne by the casing, a tubular shaft mounted for longitudinal movement in the casing and provided with a blank-shaping plunger, and an air measuring valve within said plunger shaft; means for moving said plunger shafts longitudinally, and means responsive to said movements of the plunger shafts for operating said measuring valves to puff blanks of glass engaged by the chucks.

17. In a glass forming machine, the combination with a source of supply adapted to deliver glass, of a frame, a continuously rotating turret provided with a plurality of forming units continuously movable with it, a plurality of receiving cups one in excess of the number of forming units slidably mounted on said turret, means borne by the turret for causing a receiving cup to move with the turret in registration with each forming unit from the time it receives a supply of glass until it again approaches the glass-delivery station, and means borne by said frame for holding the extra receiving cup stationary at the delivery station to receive glass said holding means being effective until the held cup is in registration with a succeeding forming unit.

18. In a glass-blowing machine, the combination of a frame, a rotatable turret provided with a plurality of forming units each including a blowing head; each blowing head comprising a casing, a chuck rotatably borne by the casing, and an air-measuring valve; a cam borne by said frame, and connections between said cam and the measuring valve of each blowing head for controlling the measuring valve in response to the rotation of the turret.

19. In a glass blowing machine, the combination of a frame, a rotatable turret provided with a plurality of forming units each including a blowing head rotatably mounted on a horizontal axis; each blowing head comprising a casing, a chuck rotatably borne by the casing, an air-measuring valve, and a blank-shaping plunger mounted for longitudinal movement within the casing; a cam borne by said frame, connections between said cam and each of said blowing head plungers for moving the plungers longitudinally, and means responsive to said movement of the plungers for operating the measuring valve of the blowing head to puff blanks of glass engaged by their chucks.

20. In a glass blowing machine, the combination of a frame, a rotatable turret provided with a plurality of forming units each including a blowing head; each blowing head comprising a casing, a chuck rotatably borne by the casing, a tubular shaft mounted for longitudinal movement in the casing and provided with a blank-shaping plunger, and an air-measuring valve within said plunger shaft; a cam borne by said frame, and connections extending from said cam to said plunger shafts for moving them longitudinally, and means responsive to said movements of the plunger shafts for operating said measuring valve to puff blanks of glass engaged by the chucks.

21. In a glass blowing machine, the combination of a turret rotatable on a vertical axis, a blowing head mounted on said turret for rotation on a horizontal axis; said head comprising a casing, a chuck rotatably borne by the casing, a plunger mounted for longitudinal movement in the casing, and an air measuring valve in the casing; means for moving said plunger longitudinally, means responsive to said movement of the plunger for intermittently operating said valve to puff a blank engaged by said chuck, and means responsive to subsequent movement of the plunger for opening said valve for continuous flow of blowing air through it.

22. In a glass blowing machine, the combination of a continuously rotating turret, a plurality of combined receiving cups and blank-forming molds borne by the turret for movement in a horizontal path with it and for rotation on horizontal axes, a plurality of blowing heads mounted on the turret below said cups for rotation on horizontal axes, a plurality of blowing molds mounted on the turret below and in registration with said blowing heads, means for turning each receiving cup downwardly on its horizontal axis to mold its contained glass as a blank upon a blowing head while in an upward position, and means for subsequently rotating each blowing head on its horizontal axis to present its attached blank to a blowing mold.

23. In a glass blowing machine, the combination of a frame, a continuously rotating turret, a plurality of combined receiving cups and blank-forming molds borne by the turret for movement in a horizontal path with it and for rotation on horizontal axes, a plurality of blowing heads mounted on the turret below said cups for rotation on horizontal axes, a plurality of blowing molds mounted on the turret below and in registration with said blowing heads, a cam borne by said frame and effective upon the rotation of the turret to turn the receiving cup downwardly on its horizontal axis to mold its contained glass as a blank upon a blowing head while in an upward position, and a cam for subsequently rotating each blowing head on its horizontal axis to present its attached blank to a mold.

24. In a glass blowing machine, the combination of a frame, a turret rotatable on a vertical axis, a plurality of blowing heads borne by the turret for rotation on horizontal axes and each including an axially rotatable chuck and a longitudinally movable blank-forming and air-controlling plunger, a motor, and connections including tubular rotatable shafts between said motor and chucks for rotating the latter, and cam-controlled rods movable longitudinally in said tubular shafts and connected to said plungers for moving the latter longitudinally.

25. In a glass blowing machine, the combination of a frame, a turret rotatable on a vertical axis, a plurality of blowing heads borne by the turret for rotation on horizontal axes and each including an axially rotatable chuck and a longitudinally movable blank-forming and air-controlling plunger, a motor, connections including tubular rotatable shafts between said motor and chucks for rotating the latter, said connections each including a clutch controlled by a cam mounted on said frame, rods mounted for longitudinal movements in said tubular shafts and connected to said plungers for moving them longitudinally, and a cam borne by said frame and engaging said rods for moving them longitudinally.

26. In a glass blowing machine, the combination of a frame, a turret rotatable on a vertical axis, a plurality of blowing heads borne by the turret for rotation on a horizontal axis, a mold-supporting ring surrounding said turret and mounted for rotation with and for vertical adjustment upon said turret, a plurality of two-part molds carried by said ring in alignment with said blowing heads, vertical rods mounted for rotation on said turret and having threaded engagement with said ring, means for simultaneously rotating said rods for vertically adjusting said ring to move said molds with relation to said blowing head, and means coordinated with the rotation of said turret for opening and closing said molds at their various vertically adjusted positions.

In testimony whereof, I sign my name.

THEODORE H. SLOAN.